US012626225B2

(12) United States Patent
Carzoli

(10) Patent No.: US 12,626,225 B2
(45) Date of Patent: May 12, 2026

(54) REMOTE EMPLOYMENT MANAGEMENT SYSTEM

(71) Applicant: PROCREWZ, INC., Lombard, IL (US)

(72) Inventor: Robert E. Carzoli, Lombard, IL (US)

(73) Assignee: PROCREWZ, LLC, Lombard, IL (US)

( * ) Notice: Subject to any disclaimer, the term of this patent is extended or adjusted under 35 U.S.C. 154(b) by 177 days.

(21) Appl. No.: 17/665,451

(22) Filed: Feb. 4, 2022

(65) Prior Publication Data

US 2022/0172169 A1 Jun. 2, 2022

Related U.S. Application Data

(63) Continuation of application No. 17/633,179, filed as application No. PCT/US2020/045063 on Aug. 5, 2020.

(Continued)

(51) Int. Cl.
*G06Q 10/105* (2023.01)
*G06Q 10/1091* (2023.01)
(Continued)

(52) U.S. Cl.
CPC ....... *G06Q 10/105* (2013.01); *G06Q 10/1091* (2013.01); *G06Q 40/125* (2013.12);
(Continued)

(58) Field of Classification Search
CPC ............. G06Q 10/105; G06Q 10/1091; G06Q 40/125; H04W 4/021; H04W 4/029; H04W 4/12; H04W 4/90
See application file for complete search history.

(56) References Cited

U.S. PATENT DOCUMENTS 8,744,933 B2 * 6/2014 Shortridge ............. G06Q 10/06
705/30
9,020,848 B1 * 4/2015 Ridge ...................... G07C 1/10
705/7.15

(Continued)

FOREIGN PATENT DOCUMENTS

AU 2014265052 A1 * 6/2015
WO 2010141891 A2 12/2010
WO WO-2021011599 A1 * 1/2021 ............... G07C 9/28

OTHER PUBLICATIONS

Mayan, "GPS enabled employee registration and attendance tracking system" (Year: 2015).*

(Continued)

*Primary Examiner* — Sangeeta Bahl
(74) *Attorney, Agent, or Firm* — Potomac Law Group, PLLC; Jamaica Potts Szeliga

(57) ABSTRACT

A method for a remote employment management system is described. The method includes logging an employee at a remote job location into and out of the remote employment management system over a predetermined period of time. The method also includes determining a jurisdiction, sales tax, and/or union benefits according to the remote job location and a remote job position of the employee at the remote job location. The method further includes generating a paycheck for the employee according to the jurisdiction, sales tax, and/or the union benefits determined according to the remote job location and the remote job position of the employee after the predetermined period of time.

20 Claims, 36 Drawing Sheets

Related U.S. Application Data

(60) Provisional application No. 62/883,564, filed on Aug. 6, 2019.

(51) Int. Cl.

| | |
|---|---|
| *G06Q 40/12* | (2023.01) |
| *H04W 4/021* | (2018.01) |
| *H04W 4/029* | (2018.01) |
| *H04W 4/12* | (2009.01) |
| *H04W 4/90* | (2018.01) |

(52) U.S. Cl.
CPC ........... *H04W 4/021* (2013.01); *H04W 4/029* (2018.02); *H04W 4/12* (2013.01); *H04W 4/90* (2018.02)

(56) References Cited

U.S. PATENT DOCUMENTS

| | | | | |
|---|---|---|---|---|
| 9,202,250 | B1 * | 12/2015 | Palaniappan | ........ G06Q 40/125 |
| 10,229,375 | B2 * | 3/2019 | Davidson | ....... G06Q 10/063114 |
| 10,657,499 | B1 * | 5/2020 | Cherry | ............... G06Q 10/1091 |
| 2013/0198048 | A1 * | 8/2013 | Tillman, Jr. | ......... G06Q 10/105 |
| | | | | 705/32 |
| 2013/0246114 | A1 | 9/2013 | Gala | |
| 2013/0290154 | A1 | 10/2013 | Cherry et al. | |
| 2013/0290200 | A1 * | 10/2013 | Singhal | ................ G06Q 30/018 |
| | | | | 705/317 |
| 2014/0249877 | A1 | 9/2014 | Hull et al. | |
| 2015/0161553 | A1 | 6/2015 | Eggleston | |
| 2015/0324943 | A1 | 11/2015 | Han et al. | |
| 2015/0327011 | A1 | 11/2015 | Fairbanks | |
| 2017/0024683 | A1 | 1/2017 | Bares et al. | |
| 2017/0116575 | A1 * | 4/2017 | DeGoler | ............ G06Q 10/1053 |
| 2017/0243170 | A1 * | 8/2017 | Rashid | .................. H04W 4/021 |
| 2018/0033244 | A1 | 2/2018 | Northrup et al. | |
| 2018/0046988 | A1 | 2/2018 | Kim | |
| 2018/0330451 | A1 * | 11/2018 | Volberg | ............ G06Q 10/1091 |
| 2019/0057340 | A1 * | 2/2019 | Wang | ................... G06Q 10/109 |
| 2019/0066058 | A1 * | 2/2019 | Spurgeon | ........... G06Q 10/1091 |
| 2019/0080335 | A1 * | 3/2019 | Degeneffe | ............ G06Q 30/018 |
| 2019/0102743 | A1 * | 4/2019 | Cirrincione | ............. G06F 16/29 |
| 2020/0042936 | A1 * | 2/2020 | Jain | ......................... G06F 40/14 |
| 2020/0293996 | A1 * | 9/2020 | Wu | ................... G06Q 10/0833 |
| 2021/0383583 | A1 | 12/2021 | Charlton et al. | |

OTHER PUBLICATIONS

Villarama, "Wireless biometric attendance management and payroll system" (Year: 2017).*

EP Extended Search Report, Sep. 5, 2022.

Examination Report for European Application No. 20850906.7, dated Jul. 3, 2025.

* cited by examiner

360

402

404

450

470

← Andrewtest Love

Job -1/30

Contact Info
555-555-5555

Position
Senior Video

Call Time
09:00 AM

Signed In
Jan 30 2019, 12:07 PM

Adjusted Sign In
Jan 30 2019, 12:07 PM     Edit ——472

Signed Out
Jan 30 2019, 12:08 PM

Adjusted Sign Out
Jan 30 2019, 12:08 PM     Edit ——474

Notes ——476
Add Notes

802

850

810

820

810

820

860

1100

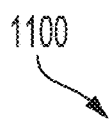

My Jobs > J-74383 - MLB Boston Red Sox
XYZ Event Partners, LLC Work Order #

Thu, Aug 26 - Sat, Aug 28, 2021 @ Fenway Park
Boston, Massachusetts 2215
(Boston (Manchester) Market)

( Sports )  ( MLB )

| Manage | Calendar | Summary |
| --- | --- | --- |

| Show Estimates | Show Actuals |
| --- | --- |

| All Positions ⌄ | Day 1<br>Thu 8/26 | Day 2<br>Fri 8/27 | Day 3<br>Sat 8/28 |
| --- | --- | --- | --- |
| Technical Director | No Call Time<br>Select Employee | No Call Time<br>Select Employee | No Call Time<br>Select Employee |
| Senior Video | No Call Time<br>Select Employee | No Call Time<br>Select Employee | No Call Time<br>Select Employee |
| Audio Assist | No Call Time<br>Select Employee | No Call Time<br>Select Employee | No Call Time<br>Select Employee |
| Audio Assist | No Call Time<br>Select Employee | No Call Time<br>Select Employee | No Call Time<br>Select Employee |
| Hard Camera Op | No Call Time<br>Select Employee | No Call Time<br>Select Employee | No Call Time<br>Select Employee |
| Hard Camera Op | + | No Call Time<br>Select Employee | No Call Time<br>Select Employee |
| Hard Camera Op | + | No Call Time<br>Select Employee | No Call Time<br>Select Employee |
| +<br>Add a Position | | | |

( ? ) Need Help?
Visit our user guide!

 My Jobs > J-74383 - MLB Boston Red Sox
XYZ    XYZ Event Partners, LLC Work Order #

Thu, Aug 26 - Sat, Aug 28, 2021 @ Fenway Park
Boston, Massachusetts 2215
(Boston (Manchester) Market)

( Sports )   ( MLB )

| Manage | Calendar | Summary |

| Show Estimates | Show Actuals |

| All Positions ▽ | Day 1<br>Thu 8/26 | Day 2<br>Fri 8/27 | Day 3<br>Sat 8/28 |
|---|---|---|---|
| Technical Director | No Call Time<br>Select Employee | 👤 Amy Scheller<br>No Call Time<br>☆ ~ | 👤 Amy Scheller<br>No Call Time<br>☆ ~ |
| Senior Video | No Call Time<br>Select Employee | No Call Time<br>Select Employee | No Call Time<br>Select Employee |
| Audio Assist | 👤 Kelli Dora2<br>No Call Time<br>☆ ~ | 👤 Kelli Dora2<br>No Call Time<br>☆ ~ | 👤 Kelli Dora2<br>No Call Time<br>☆ ~ |
| Audio Assist | No Call Time<br>Select Employee | No Call Time<br>Select Employee | No Call Time<br>Select Employee |
| Hard Camera Op | No Call Time<br>Select Employee | No Call Time<br>Select Employee | No Call Time<br>Select Employee |
| Hard Camera Op | + | No Call Time<br>Select Employee | No Call Time<br>Select Employee |
| Hard Camera Op | + | No Call Time<br>Select Employee | No Call Time<br>Select Employee |
| +<br>Add a Position | | | |

(?) Need Help?
Visit our user guide!

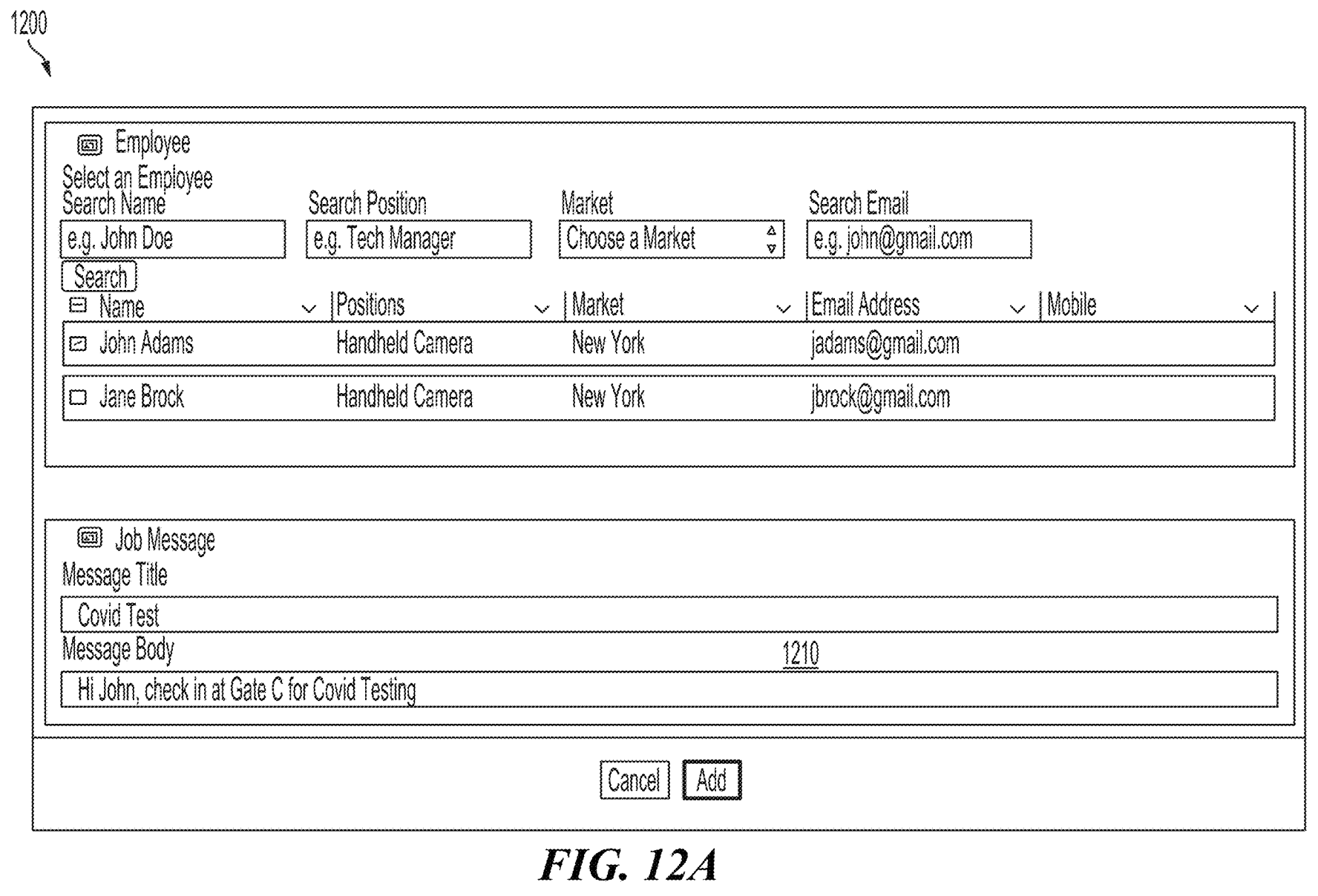

◉ Employee

Select an Employee
Search Name e.g. John Doe

Search

Search Position e.g. Tech Manager

Market

Choose a Market  ◁ ▷

Search Email e.g. john_john@gmail.com

| ☐ Name | > | Positions | > | Market | > | Email Address | > | Mobile |
|--------|---|-----------|---|--------|---|---------------|---|--------|
| ☑ John Adams | | Handheld Camera | | New York | | jadams@gmail.com | | |
| ☐ Jane Brock | | Handheld Camera | | New York | | jbrock@gmail.com | | |

◉ Job Message

Message Title

Covid Test

Message Body

Hi John, check in at Gate C for Covid Testing

1210

Cancel  Add

*FIG. 12A*

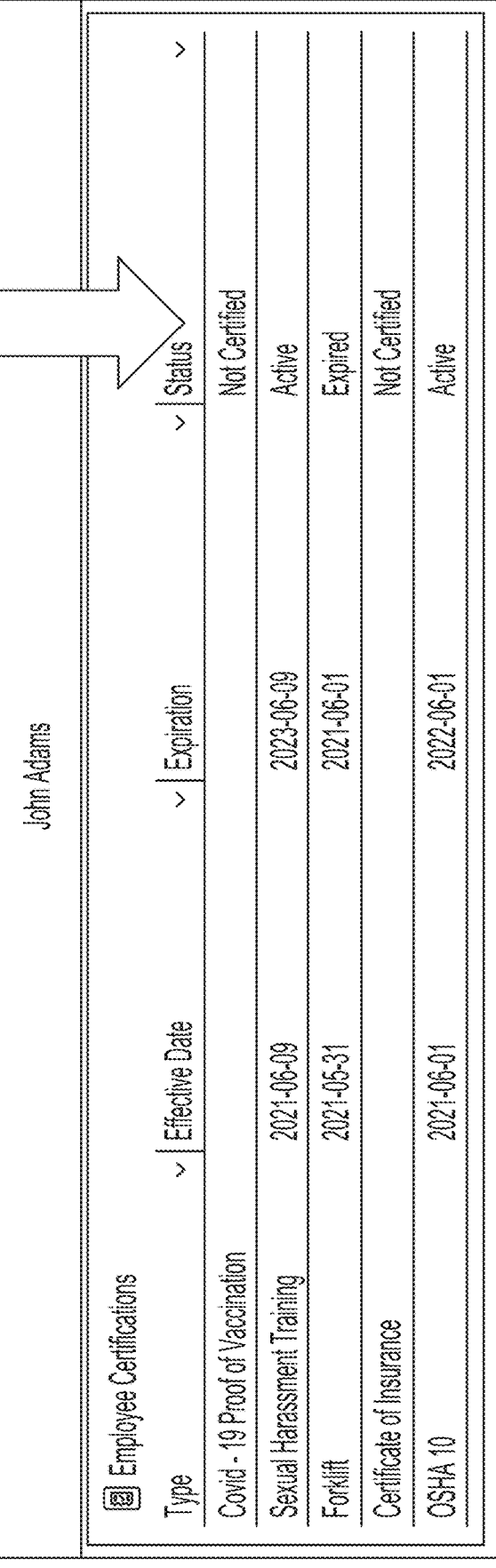
*FIG. 12B*

The user taps the sign out button, and the exit survey is presented from the bottom of the screen The intro shows a customized title and message with information about the exit survey The first question asks the user if they took their rest break If the user answers no, they are presented with a follow up question asking for further information Exit Survey Complete

1480

1452

1450

1600

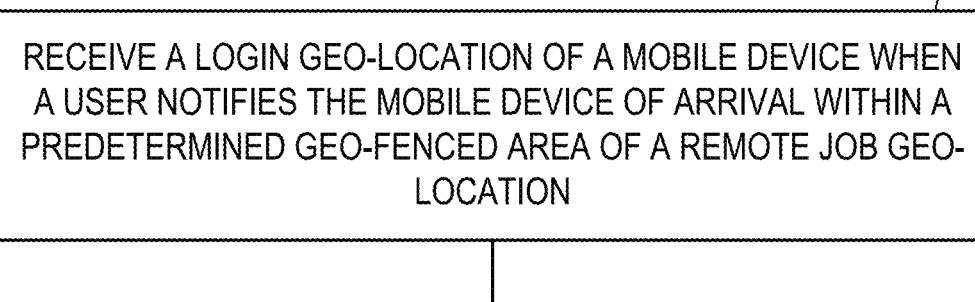

1610

RECEIVE A LOGIN GEO-LOCATION OF A MOBILE DEVICE WHEN A USER NOTIFIES THE MOBILE DEVICE OF ARRIVAL WITHIN A PREDETERMINED GEO-FENCED AREA OF A REMOTE JOB GEO-LOCATION

1612

VERIFY THE LOGIN GEO-LOCATION OF THE MOBILE DEVICE WITHIN THE PREDETERMINED GEO-FENCED AREA OF THE REMOTE JOB GEO-LOCATION

1614

LOG THE MOBILE DEVICE INTO A REMOTE EMPLOYMENT MANAGEMENT SYSTEM WHEN A CURRENT TIME IS WITHIN A PREDETERMINED AMOUNT OF TIME BEFORE OR AT A START TIME

*FIG. 16*

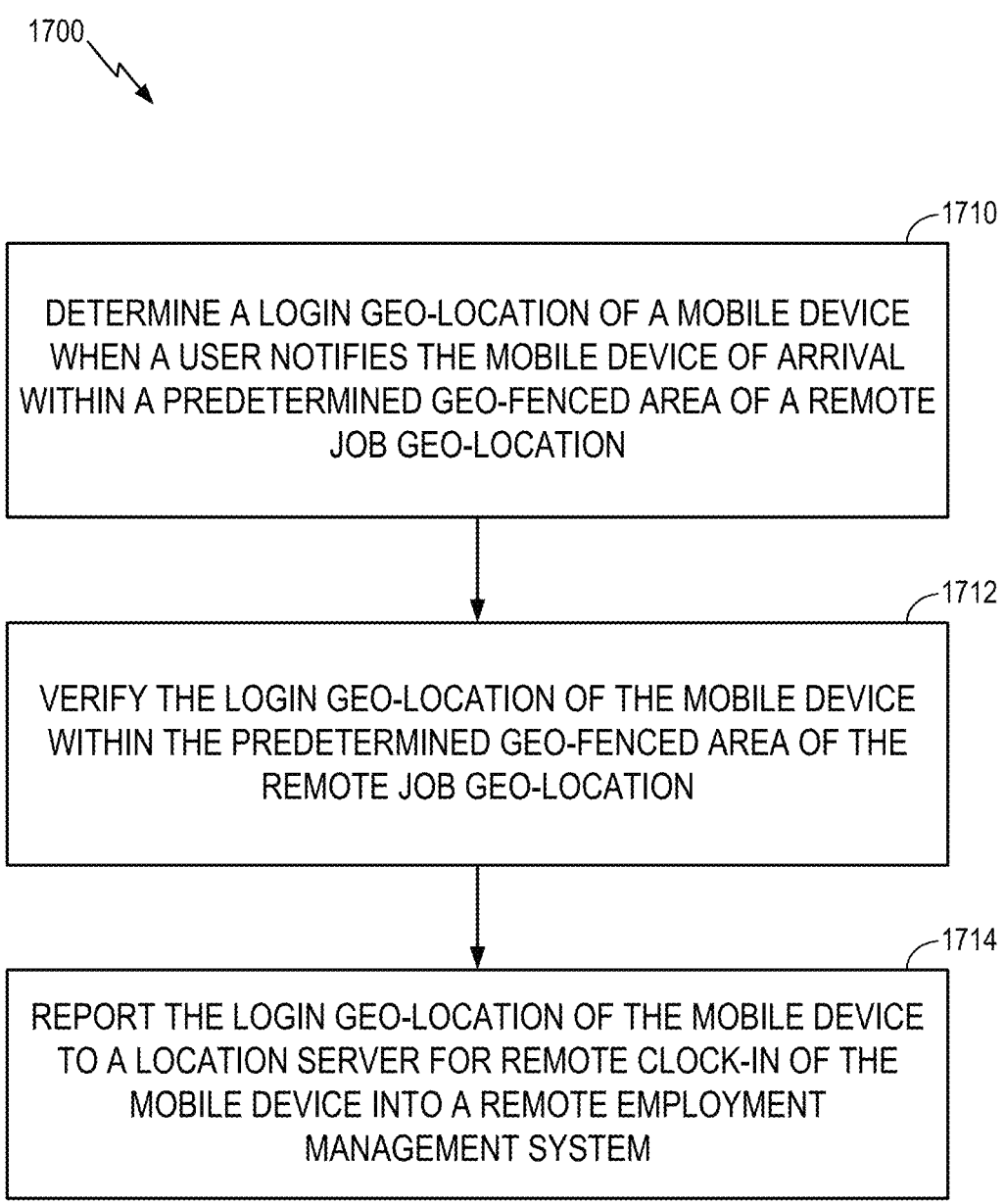

1700

1710

DETERMINE A LOGIN GEO-LOCATION OF A MOBILE DEVICE WHEN A USER NOTIFIES THE MOBILE DEVICE OF ARRIVAL WITHIN A PREDETERMINED GEO-FENCED AREA OF A REMOTE JOB GEO-LOCATION

1712

VERIFY THE LOGIN GEO-LOCATION OF THE MOBILE DEVICE WITHIN THE PREDETERMINED GEO-FENCED AREA OF THE REMOTE JOB GEO-LOCATION

1714

REPORT THE LOGIN GEO-LOCATION OF THE MOBILE DEVICE TO A LOCATION SERVER FOR REMOTE CLOCK-IN OF THE MOBILE DEVICE INTO A REMOTE EMPLOYMENT MANAGEMENT SYSTEM

*FIG. 17*

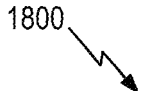

1800

1810

LOG AN EMPLOYEE AT A REMOTE JOB LOCATION INTO AND OUT OF A REMOTE EMPLOYMENT MANAGEMENT SYSTEM OVER A PREDETERMINED PERIOD OF TIME

1812

DETERMINE A JURISDICTION, SALES TAX, AND/OR UNION BENEFITS ACCORDING TO THE REMOTE JOB LOCATION AND A REMOTE JOB POSITION OF THE EMPLOYEE AT THE REMOTE JOB LOCATION

1814

GENERATE A PAYCHECK FOR THE EMPLOYEE ACCORDING TO THE JURISDICTION, SALES TAX, AND/OR UNION BENEFITS DETERMINED ACCORDING TO THE REMOTE JOB LOCATION AND THE REMOTE JOB POSITION OF THE EMPLOYEE AFTER THE PREDETERMINED PERIOD OF TIME

*FIG. 18*

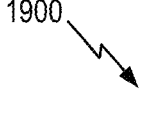

1900

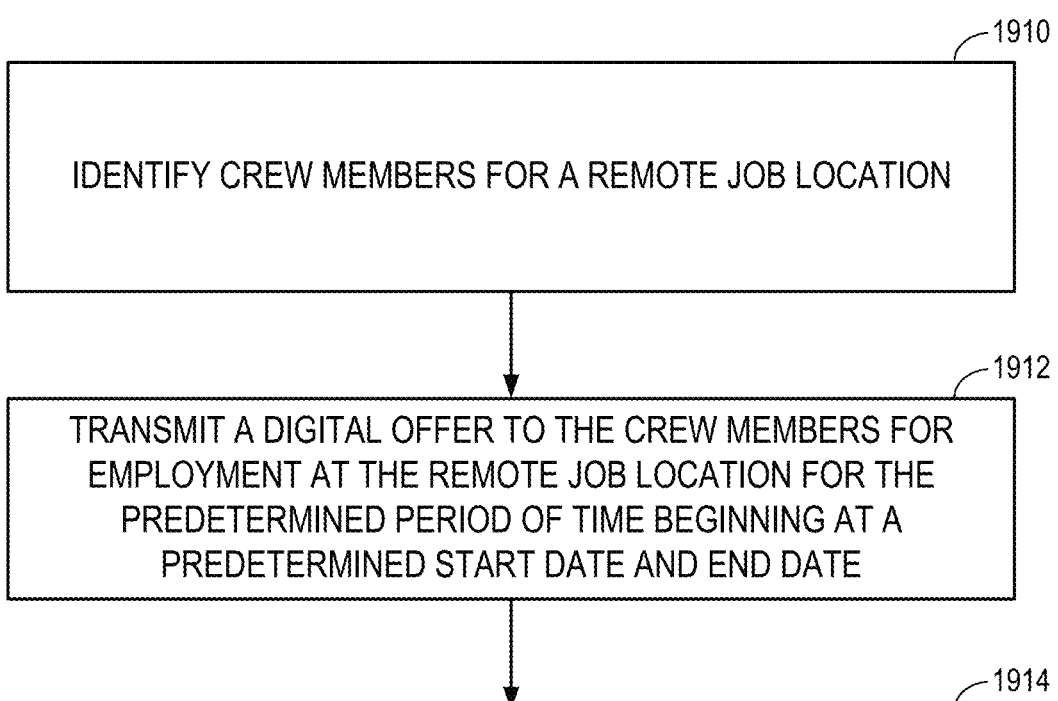

1910

IDENTIFY CREW MEMBERS FOR A REMOTE JOB LOCATION

1912

TRANSMIT A DIGITAL OFFER TO THE CREW MEMBERS FOR EMPLOYMENT AT THE REMOTE JOB LOCATION FOR THE PREDETERMINED PERIOD OF TIME BEGINNING AT A PREDETERMINED START DATE AND END DATE

1914

RECEIVE A DIGITAL ACCEPTANCE FROM AT LEAST A PREDETERMINED NUMBER OF THE CREW MEMBERS PRIOR TO THE PREDETERMINED START DATE TO ESTABLISH A PRODUCTION CREW FOR THE REMOTE JOB LOCATION

*FIG. 19*

REMOTE EMPLOYMENT MANAGEMENT SYSTEM

CROSS-REFERENCE TO RELATED APPLICATIONS

The present application is a Continuation of U.S. patent application Ser. No. 17/633,179, filed Feb. 4, 2022, and titled "REMOTE EMPLOYMENT MANAGEMENT SYSTEM", which claims priority to P.C.T. Patent Application No. PCT/US2020/045063, filed Aug. 5, 2020, and titled "REPORTING LOGIN GEOLOCATION FOR GEOFENCED REMOTE CLOCK-IN/CLOCK-OUT VERIFICATION OF A REMOTE JOB MANAGEMENT SYSTEM," which claims the benefit of U.S. Provisional Patent Application No. 62/883,564, filed Aug. 6, 2019, and titled "REPORTING LOGIN GEOLOCATION FOR GEOFENCED REMOTE CLOCK-IN/CLOCK-OUT VERIFICATION OF A REMOTE JOB MANAGEMENT SYSTEM," the disclosures of which are expressly incorporated by reference herein in their entirety.

BACKGROUND

Field

Aspects of the present disclosure relate, in general, to remote geo-location and, more particularly, to a remote employment management system.

Background

It may be beneficial to obtain the location of a mobile device such as a wireless phone, laptop, tablet, identity tag, etc., at one or more times and to provide the location to some client application or device for the purpose of supporting some service or function. Examples of services and functions include providing navigation instructions to the user of the mobile device, tracking and/or recording the location of some valuable asset, and enabling the mobile device to obtain its own location.

To support the location of mobile devices that have the capability to access wireless networks such as global system for mobile communications (GSM), code division multiple access (CDMA), wideband CDMA (WCDMA), long term evolution (LTE), and Wi-Fi and/or fixed access networks such as packet cable and DSL, a number of position methods and associated positioning protocols have been developed that rely on communications between the mobile device and a location server supported by one or more intervening fixed and/or wireless networks. One such positioning protocol developed by the 3rd Generation Partnership Project (3GPP) in 3GPP Technical Specification (TS) 36.355, which is publicly available, is known as the LTE Positioning Protocol (LPP) and is intended to locate mobile devices that are currently accessing an LTE network.

Unfortunately, tracking the location of a user's mobile device may constitute an invasion of privacy when conducted by an employer. For example, managing a remote work force at off-site job locations is problematic. A remote employment management system, which does not invade employee's privacy, is desired.

SUMMARY

A method for a remote employment management system is described. The method includes logging an employee at a remote job location into and out of the remote employment management system over a predetermined period of time. The method also includes determining a jurisdiction, sales tax, and/or union benefits according to the remote job location and a remote job position of the employee at the remote job location. The method further includes generating a paycheck for the employee according to the jurisdiction, sales tax, and/or the union benefits determined according to the remote job location and the remote job position of the employee after the predetermined period of time.

A remote employment management system is described. The remote employment management system includes an employment server to log an employee at a remote job location into and out of the remote employment management system over a predetermined period of time according to a mobile device of the employee. The remote employment management system also includes a payroll server to determine a jurisdiction, sales tax, and/or union benefits according to the remote job location and a remote job position of the employee at the remote job location. The payroll server is further used to generate a paycheck for the employee according to the jurisdiction, sales tax, and/or the union benefits determined according to the remote job location and the remote job position of the employee after the predetermined period of time.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 11A and 11B illustrate calendar view screens generated in response to a calendar tab of the job detail screen of FIG. 10B, according to aspects of the present disclosure.

FIGS. 12A-12B illustrate implementations of the push notifications and direct links module of the remote employment management system of FIG. 2, configured to enable crew communication, according to aspects of the present disclosure.

FIG. 16 illustrates a method for geo-fenced remote clock-in/clock-out verification of the remote employment management system of FIG. 2, according to aspects of the present disclosure.

FIG. 17 illustrates a method of reporting a login geo-location for geo-fenced remote clock-in/clock-out verification of a remote employment management system, according to aspects of the present disclosure.

FIG. 18 illustrates a method for a remote employment management system, according to aspects of the present disclosure.

FIG. 19 illustrates a method for a multi-step job offer process with digital acceptance of a remote employment management system, according to aspects of the present disclosure.

DETAILED DESCRIPTION

Figure 1A:
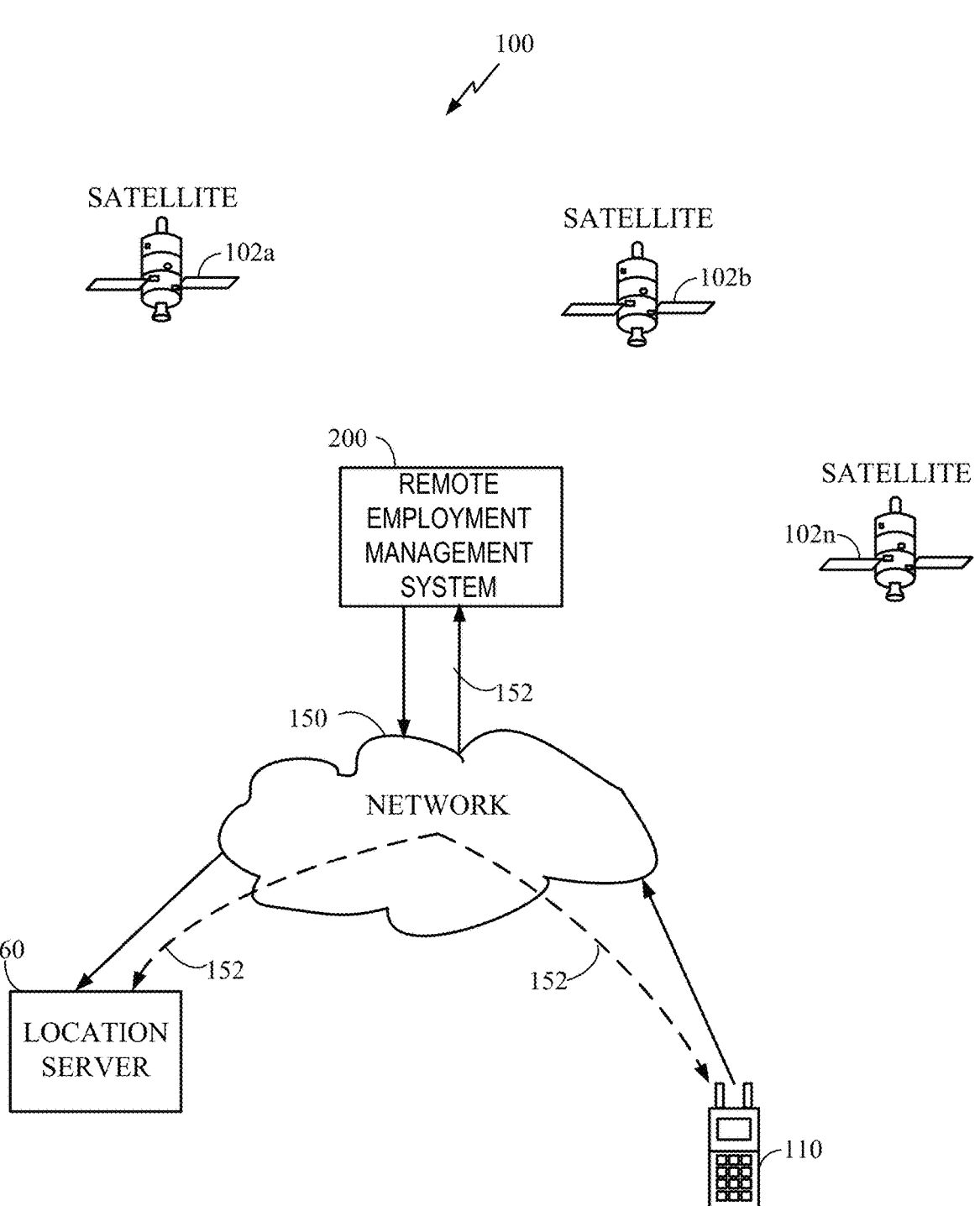
FIG. 1A is a block diagram illustrating a system to report a login geo-location from a mobile device to a location server to verify the geo-location of the mobile device within a predetermined geo-fenced clock-in verification area of a remote job location for a remote employment management system, according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described herein, the use of the term "and/or" is intended to represent an "inclusive OR," and the use of the term "or" is intended to represent an "exclusive OR." As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations.

One aspect of the present disclosure reports a login geo-location from a target device to a location server to verify the geo-location of the target device within a predetermined geo-fenced clock-in verification area of a remote job location for a remote employment management system. In particular, the target device may rely on an employee to trigger reporting of the login geo-location. The target device transmits the login geo-location to a location server that uses the login geo-location to verify the login geo-location of the mobile device is within a predetermined geo-fenced clock-in verification area of a remote job location for the remote employment management system. The verified login geo-location can then trigger a remote clock-in by the location server for the remote employment management system if the current time is within a predetermined amount of time before (or at) a start time for the remote job location.

Alternatively, the mobile device verifies that the login geo-location is within the predetermined geo-fenced clock-in verification area of the remote job location before notifying the remote employment management system of a clock-in request. In this configuration, the remote employment management system clocks-in the employee if the current time is within the predetermined amount of time before (or at) a start time for the remote job location by generating a clock-in record in a remote employment database. While the mobile device may rely on a global positioning system (GPS) signal as the login geo-location, in one configuration, the mobile device may rely on a mapping application, a camera, or other like sensor to confirm the mobile device is within the predetermined geo-fenced clock-in verification area of the remote job location for the remote employment management system. Clock-in of the employee may trigger the mobile device of the remote employment management system to display federal and state employment laws based on the remote job location. In an alternative configuration, a job location may be outside the predetermined geo-fenced clock-in verification area, such as a nearby location.

According to aspects of the present disclosure, one possible use for a geo-fenced remote clock-in/clock-out verification of a remote employment management system is a film crew for a sporting event at a sporting stadium (e.g., Wrigley Field in Chicago, Illinois). For example, a job details screen may illustrate an employee is a technical director for a Major League Baseball (MLB) game being played at Wrigley Field. The job detail screen includes a "CLOCK IN" button to trigger the geo-fenced remote clock-in/clock-out verification of the present disclosure. In an alternative configuration, the job location is outside of a geo-fenced area defining the sporting stadium, such as a nearby fan location. In this alternative configuration, a point-of-contact (POC) for the remote job adjusts the clock-in/clock-out for the employee.

In aspects of the present disclosure, a method for a remote employment management system logs an employee at the remote job location into and out of the remote employment management system over a predetermined period of time. For example, the predetermined period of time a multiple hour period of time associated with a live event at the remote job location. This method for the remote employment management system automatically determines a jurisdiction, sales tax, and/or union benefits according to the remote job location and a remote job position of the employee at the remote job location. For example, the remote employment management system automatically determines a union pay rate for the employee according to the jurisdiction, sales tax, and/or union benefits determined according to the remote job location and the remote job position of the employee. After the predetermined period of time, the remote employment management system generating a paycheck for the employee according to the jurisdiction, sales tax, and/or union benefits determined according to the remote job location and the remote job position of the employee.

The method for the remote employment management system provides a multi-step job offer process with digital acceptance. According to this method, a crew manager of an upcoming remote job at the remote job location identifies crew members for the remote job location. According to this method potential crew members set their availability through a mobile application implementing the remote employment management system. The crew manager may identify potential crew members for the remote job location through the mobile application implementing the remote employment management system. Once identified, the mobile application transmits a digital offer to the identified crew members for employment at the remote job location for the predetermined period of time beginning at a predetermined start date and end date. In this aspect of the present disclosure, the crew manager receives, through the mobile application, a digital acceptance from at least a predetermined number of the crew members prior to the predetermined start date to establish a production crew for the remote job location.

According to further aspects of the present disclosure, the method for the remote employment management system includes arranging transportation for at least one of the predetermined number of crew members of the production crew prior to the predetermined start date. In these aspects of the present disclosure, arrangement of transportation is provided through the mobile application. In some aspects of the present disclosure, the mobile application notifies the production crew when a predetermined event is detected regarding the remote job location. For example, this notification of the production crew may include communicating a testing location to the production crew in response to logging the production crew at the remote job location. In other aspects of the present disclosure, notifying of the production crew includes issuing a message to the production crew in response to detection of a positive test for a contagious disease at the remote job location.

In other aspects of the present disclosure, the mobile application of the remote employment management system determining state mandated training according to the remote job location. Once determined, the remote employment management system verifies the production crew receives the determined state mandated training prior to the predetermined start date. The mobile application may also compute dark days, travel days, regular hours, sick days, and/or paid time off according to the according to the jurisdiction, sales tax, and/or union benefits determined based on the remote job location and the remote job position of the employee. In addition, the mobile application displays federal and state employment laws based on the remote job location in response to a clock-in of the employee into the remote employment management system.

FIG. 1A is a block diagram illustrating a system 100 to report a login geo-location from a target device to a location server to verify the geo-location of the target device within a predetermined geo-fenced clock-in verification area of a remote job location for a remote employment management system, according to aspects of the present disclosure. FIG. 1A includes a mobile device 110, a location server 160, and a remote employment management system 200, as further illustrated in FIG. 2. The mobile device 110 may be a wireless terminal, wireline terminal, cell phone, smartphone, laptop, tablet etc., and may be referred to as a user equipment (UE), mobile station (MS), mobile target device, target device, or target. The location server 160 may be a 3rd Generation Partnership Project (3GPP) serving mobile location center (SMLC), a standalone SMLC (SAS) or a 3rd Generation Partnership Project 2 (3GPP2) position determining entity (PDE) or an Open Mobile Alliance (OMA) secure user plane location (SUPL) location platform (SLP) supporting the OMA SUPL solution, or some other location server.

The mobile device 110 includes access to a network 150. The network 150 may be a wireless or fixed network. The location server 160 is also attached to the network 150. An employment server (not shown in FIG. 1A) may be connected to the location server 160 to request and receive a verified geo-location of the mobile device 110 within a predetermined geo-fenced clock-in verification area of a remote job location. A login geo-location of the mobile device is verified when a longitudinal position and a latitudinal position of the mobile device 110 fall within the longitudinal and latitudinal positions of the predetermined geo-fenced clock-in verification area of the remote job location. In reality, the location server 160 may reside inside the network 150 or external to the network 150 within the remote employment management system 200, and have communications access to the network 150. Alternatively, the location server 160 and/or the remote employment management system 200 may reside inside or are attached to another network (not shown) that is reachable via the network 150. GPS or global navigation satellite system (GNSS) satellites 102a-102n are detectable by the mobile device 110.

Position location signals may be transmitted from satellites 102a-102n. The position location signals transmitted from the satellites 102a-102n may be received by the network 150. The network 150 forwards the satellite information to the location server 160, which may transmit part or all of the satellite information as assistance data to any number of receivers and/or transceivers and/or servers and/or terminals. The network may transmit part or all of the satellite information as assistance data to the mobile device 110 whose user may be seeking to establish a position location using satellite position system (SPS) technology included in the mobile device 110. Location related data, such as assistance data and location measurement data, may also be transmitted between the mobile device 110 and the location server 160.

In aspects of the present disclosure, transfer of assistance data (e.g., satellite information) and/or location information between the mobile device 110 and the location server 160 may employ a communications capability 152 (e.g., a connection or session) through the network 150 (and through additional networks if the location server 160 (or an employment server (not shown)) is connected to another network and not to the network 150). Communications capability 152 may use a transport protocol, such as the Transmission Control Protocol (TCP) and Internet Protocol (IP) or protocols associated with and defined for the particular type (e.g., GSM, CDMA, WCDMA, or LTE) of the network 150 and may employ a remote login geo-location verification protocol supported by the location server 160 and the mobile device 110, but not necessarily by the network 150.

Figure 1B:
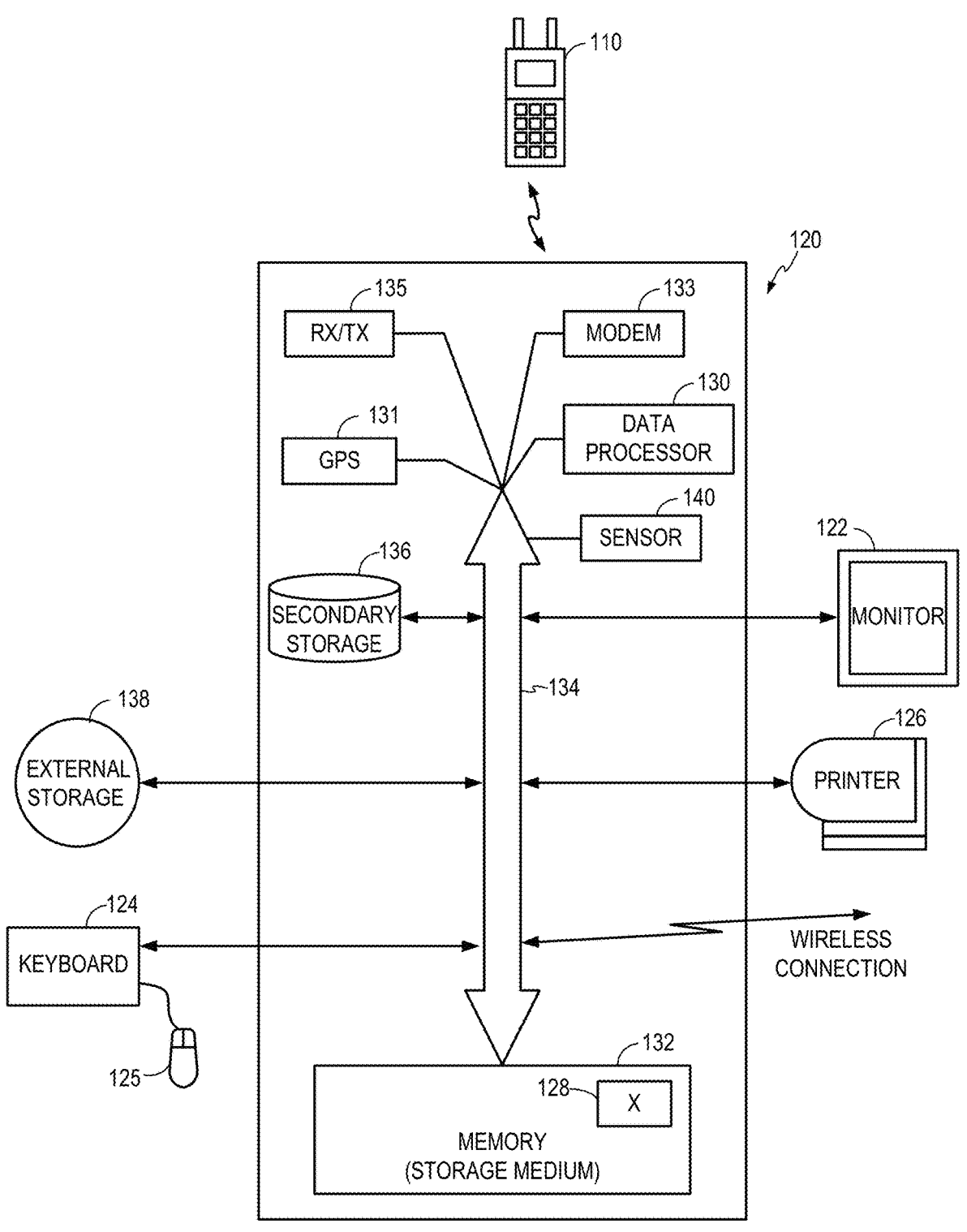
FIG. 1B is a block diagram illustrating a mobile device having a computer processing system to report a login geo-location of the mobile device to a location server in response to a user of the mobile device for the remote employment management system of FIG. 1A, according to one aspect of the present disclosure.

The mobile device 110 may include local sensors 140 (as illustrated in FIG. 1B), such as a camera. Those skilled in the art will appreciate the local sensors 140 may be located within the mobile device 110 or may be communicatively attached to the mobile device 110 to work in conjunction with the mobile device 110. Data related to a login/logout geo-location, including a relative change in geo-location, may be obtained from the local sensors 140. In addition, the mobile device 110 may determine a relative geo-location or a change in geo-location. For example, the mobile device 110 may make use of a series of photographs or video to estimate a login/logout geo-location and verify the login geo-location is within the predetermined geo-fenced clock-in verification area of a remote job location. For example, a photograph of a section of a parking lot surrounding the remote job location may verify the login geo-location of the mobile device 110 is within the predetermined geo-fenced clock-in verification area of a remote job location.

FIG. 1B is a block diagram illustrating the mobile device 110 having a computer processing system 120 to report a login geo-location of the mobile device 110 to the location server 160 in response to a user of the mobile device 110 for the remote employment management system of FIG. 1A, according to one aspect of the present disclosure. As shown, the computer processing system 120 is operatively connected to the mobile device 110. In one aspect, the computer processing system 120 is housed within the mobile device 110. The computer processing system 120 is adapted to receive, store, process, and execute instructions at least in connection with location information, including data related to a login/logout geo-location.

The components of the computer processing system 120 may include local sensors 140, a data processor 130, a position location receiver (e.g., a GPS receiver) 131, a storage medium 132, a wireless modem 133, and a cellular receiver/transceiver 135, all coupled by an interconnect link 134 (e.g., a bus). The storage medium 132 is a machine- or computer-readable medium and may include, but is not limited to, volatile memories such as dynamic random-access memory (DRAM), static random-access memory (SRAM), as well as non-volatile memories such as read-only memory (ROM), flash memory, erasable programmable read-only memory (EPROM), electrically erasable programmable read-only memory (EEPROM), and bubble memory.

In this configuration, a secondary storage 136, an external storage 138, and output devices, such as a monitor 122, may be included with the mobile device 110. In an optional configuration, input devices such as a keyboard 124, a mouse 125, and a printer 126 are included with the mobile device 110. The secondary storage 136 may include machine-readable media such as, but not limited to, a hard disk drive, a magnetic drum, and a non-volatile memory (NVM), such as a solid-state drive (SSD), including a flash memory drive. The external storage 138 may include machine-readable media, and even other computers connected via a communications line.

The distinction between the secondary storage 136 and external storage 138 is primarily for convenience in describing the use of machine-readable memory. As such, a person skilled in the art will appreciate that there is substantial functional overlap between and among the components. Computer software and user programs can be stored in the storage medium 132 and the external storage 138. Executable versions of computer software may be read from the storage medium 132 and loaded for execution directly into volatile storage medium, executed directly out of non-volatile storage medium, or stored on the secondary storage 136 prior to loading into a volatile storage medium for execution.

The computer processing system 120 illustrated in FIG. 1B of the mobile device 110 includes a set of computer instructions (in this document, "instructions") 128 for implementing the methods of the remote login geo-location verification within a predetermined geo-fenced clock-in verification area of a remote job location, described in this document. The instructions 128 are illustrated in FIG. 1B diagrammatically solely as an aid in understanding the method of the remote login geo-location verification system described in this document. The instructions 128 may be stored in various internal memory or may be implemented in hardware. The instructions 128 may also be included in a computer processing system of a computer located external to the mobile device 110, for example, on a secured intranet, on the Internet, or at a base station (not shown), from which they may be transmitted to the mobile device 110. Data associated with the instructions 128 may be received, stored, processed, and transmitted to others of the mobile device 110; however, only the mobile device 110 is illustrated for the sake of clarity.

Figure 1C:
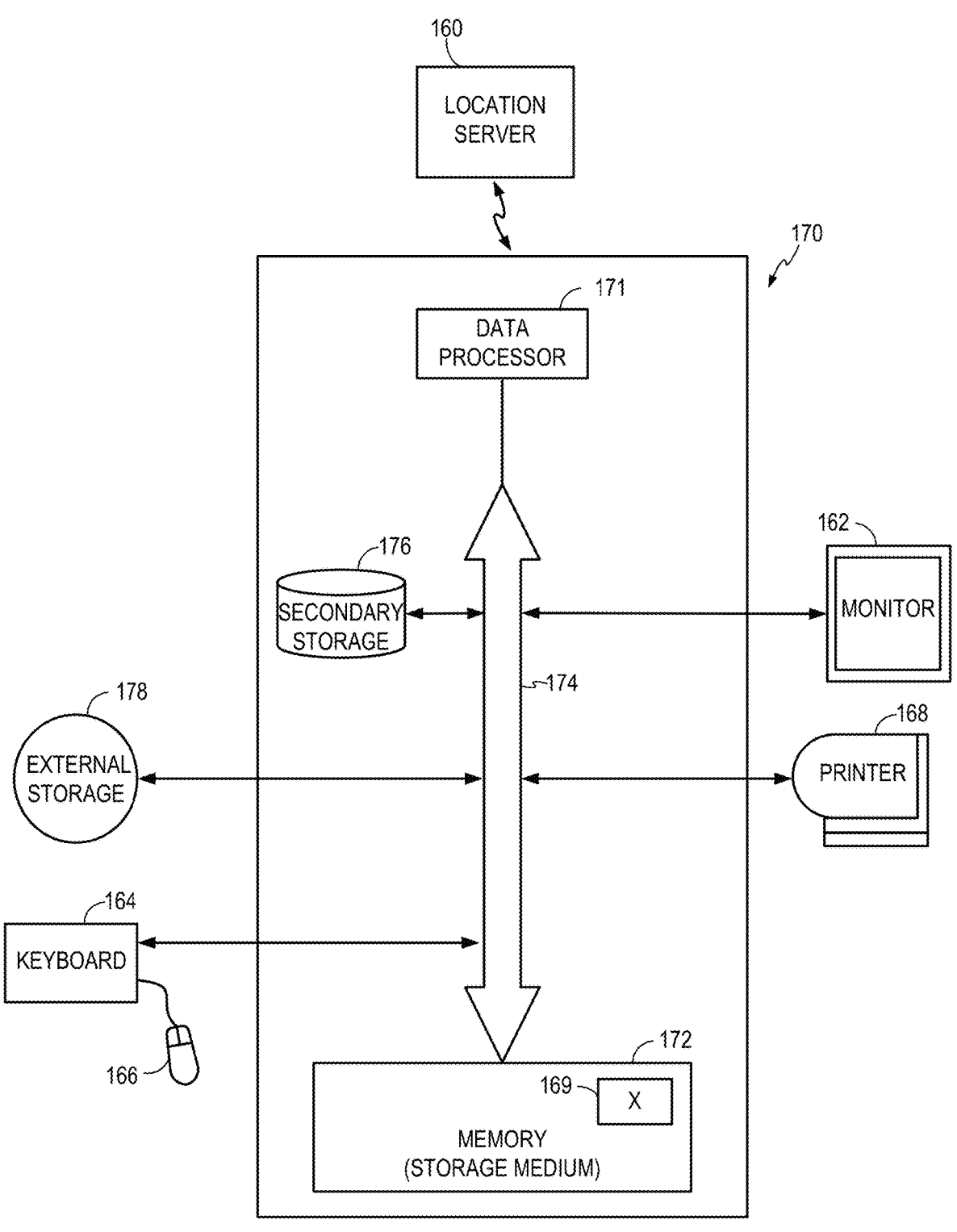
FIG. 1C is a block diagram illustrating a location server having a computer processing system to verify the geolocation of a mobile device within a predetermined geo-fenced clock-in verification area of a remote job location for the remote employment management system of FIG. 1A, according to aspects of the present disclosure.

FIG. 1C is a block diagram illustrating the location server 160 having a computer processing system 170 to verify the login geo-location of the mobile device 110 within a predetermined geo-fenced clock-in verification area of a remote job location for the remote employment management system of FIG. 1A, according to aspects of the present disclosure. In one aspect, the computer processing system 170 is housed in the location server 160. The computer processing system 170 is adapted to receive, store, process, and execute instructions at least in connection with geo-location login/logout position data including position signals, and base station position location signals that include position location data.

The components of the computer processing system 170 may include a data processor 171 and a storage medium 172 coupled by a bus 174. The storage medium 172 is a machine- or computer-readable medium and may include, but is not limited to, volatile memories such as DRAM, and SRAM, as well as non-volatile memories such as ROM, FLASH, EPROM, EEPROM, and SSD memory (e.g., flash memory).

In addition, a secondary storage 176, an external storage 178, and output devices such as a monitor 162 may be included with the location server 160. In another configuration, an input device such as a keyboard 164, a mouse 166, and a printer 168 may be included with the location server 160. The secondary storage 176 may include machine-readable media such as, but not limited to, a hard disk drive, a solid-state drive (SSD), or other drive based memory. The external storage 178 may include machine-readable media such as removable memory cards, and even other computers connected via a communications line.

The distinction between secondary storage 176 and the external storage 178 is primarily for convenience in describing the use of machine-readable memory. As such, a person skilled in the art will appreciate that there is substantial functional overlap between and among these components. Computer software and user programs can be stored in the storage medium 172 and the external storage 178. Executable versions of computer software can be read from storage medium 172 such as a non-volatile storage medium, loaded for execution directly into volatile storage medium, executed directly out of non-volatile storage medium, or stored on the secondary storage prior to loading into volatile storage medium for execution.

The computer processing system 170 illustrated in FIG. 1C of the location server 160 includes a set of computer instructions (in this document, "instructions") 169 for implementing the methods of the remote login/logout geo-location verification system 100 described herein. The instructions 169 may be stored in various internal memory or may be implemented in hardware. The instructions 169 may also be included in a computer processing system of a computer located external to the location server 160, for example, on a secured intranet, on the Internet, or at a base station, from which they may be transmitted to the location server 160.

According to one aspect of the present disclosure, a target device (such as the mobile device 110 of FIG. 1A) may report a login/logout geo-location from the mobile device 110 to the location server 160. In this aspect of the present disclosure, the location server 160 verifies the login/logout geo-location of the mobile device 110 is within a predetermined geo-fenced clock-in/clock-out verification area of a remote job location. In particular, the mobile device 110 may rely on an employee to trigger reporting of the login/logout geo-location to the location server 160. The mobile device 110 transmits the login/logout geo-location to the location server 160.

In this configuration, the location server 160 verifies the login/logout geo-location of the mobile device 110 is within a predetermined geo-fenced clock-in/clock-out verification area of a remote job location for the remote employment management system 200 of FIG. 1A. The verified login/logout geo-location can then trigger a remote clock-in for the remote employment management system 200 of FIG. 1A (or an employment server) if the current time is within a predetermined amount of time before (or at) a start time for the remote job location.

In one configuration, the mobile device 110 may make use of a series of photographs or video to estimate a login/logout geo-location. The mobile device verifies the login/logout geo-location is within the predetermined geo-fenced clock-in verification area of a remote job location. For example, a photograph of a section of a parking lot surrounding the remote job location may verify the login/logout geo-location of the mobile device 110 is within the predetermined geo-fenced clock-in verification area of the remote job location. This configuration may be useful for remote job locations that begin outside of a predetermined geo-fenced clock-in/clock-out verification area, such as filming at a fan location.

Figure 1D:
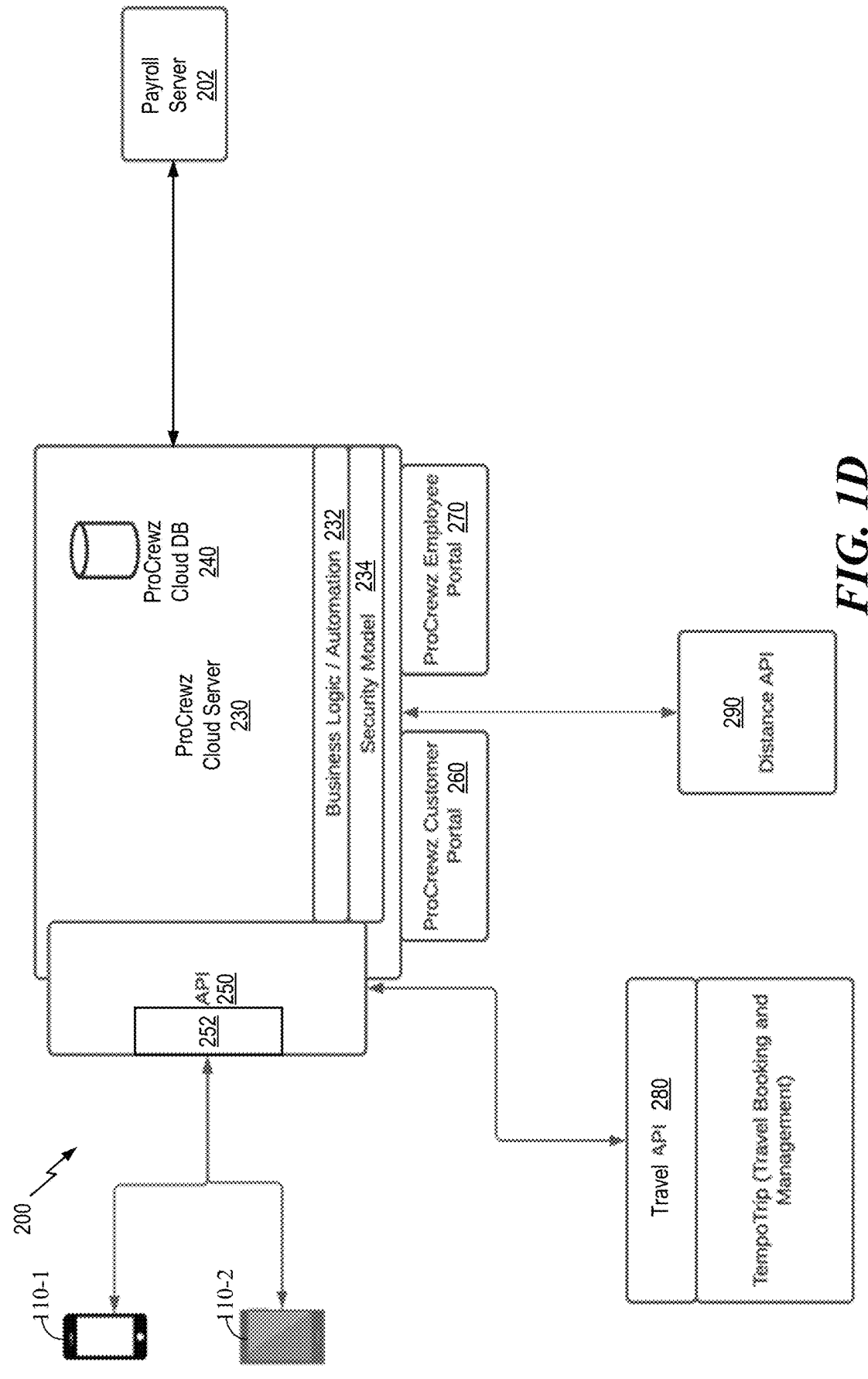
FIG. 1D is a block diagram further illustrating the remote employment management system of FIG. 1D, according to aspects of the present disclosure.

FIG. 1D is a block diagram further illustrating the remote employment management system of FIG. 1D, according to aspects of the present disclosure. In this aspects of the present disclosure, the remote employment management system 200 includes backend components such as a cloud server 230 including a cloud database 240. In some configurations, the cloud server 230 provides a set of services that govern object relationships in the cloud database 240, which store product related data, such as remote employment data. The cloud server 230 also includes an application programing interface (API) that provides a set of services that connect the cloud database 240 to front-end components of the remote employment management system 200.

For example, the front-end components of the remote employment management system 200 include an administration portal (e.g., business logic/automation 232 and security model 234) configured to provide customer relationship management services. The front-end components of the remote employment management system 200 include a customer web portal 260, an employee web portal 270, and an employee mobile application 252 (e.g., iOS (mobile device 110-1)/Android (mobile device 110-2)). The customer web portal 260 may provide a web interface for managing remote jobs, remote employees, and invoices. In addition, the employee web portal 270 may provide a web interface for managing time, expenses, travel, and communications. Similarly, the employee mobile application 252 may provide a mobile interface for managing time, expenses, travel, and communications.

The remote employment management system 200 also includes a payroll server 202 to provide automated payroll processing. For example, the payroll server 202 automatically determines a jurisdiction, sales tax, and/or union benefits according to the remote job location and a remote job position of the employee at the remote job location. For example, the payroll server 202 automatically determines a union pay rate for the employee according to the jurisdiction, sales tax, and/or union benefits determined according to the remote job location and the remote job position of the employee. In addition, the payroll server 202 generating a paycheck for the employee according to the jurisdiction, sales tax, and/or union benefits determined according to the remote job location and the remote job position of the employee.

The remote employment management system 200 further includes a travel API 280 is configured to arrange transportation for at least one of a predetermined number of crew members of a production crew prior to a start date of a remote job. In this example, remote employment management system 200 also includes a distance API 290. In this aspect of the present disclosure, the distance API 290 verifies the login/logout geo-location of the mobile device 110 is within a predetermined geo-fenced clock-in/clock-out verification area of a remote job location. In particular, the mobile device 110 may rely on an employee to trigger reporting of the login/logout geo-location to the distance API 290. The mobile device 110 transmits the login/logout geo-location to the distance API 290.

Figure 2:
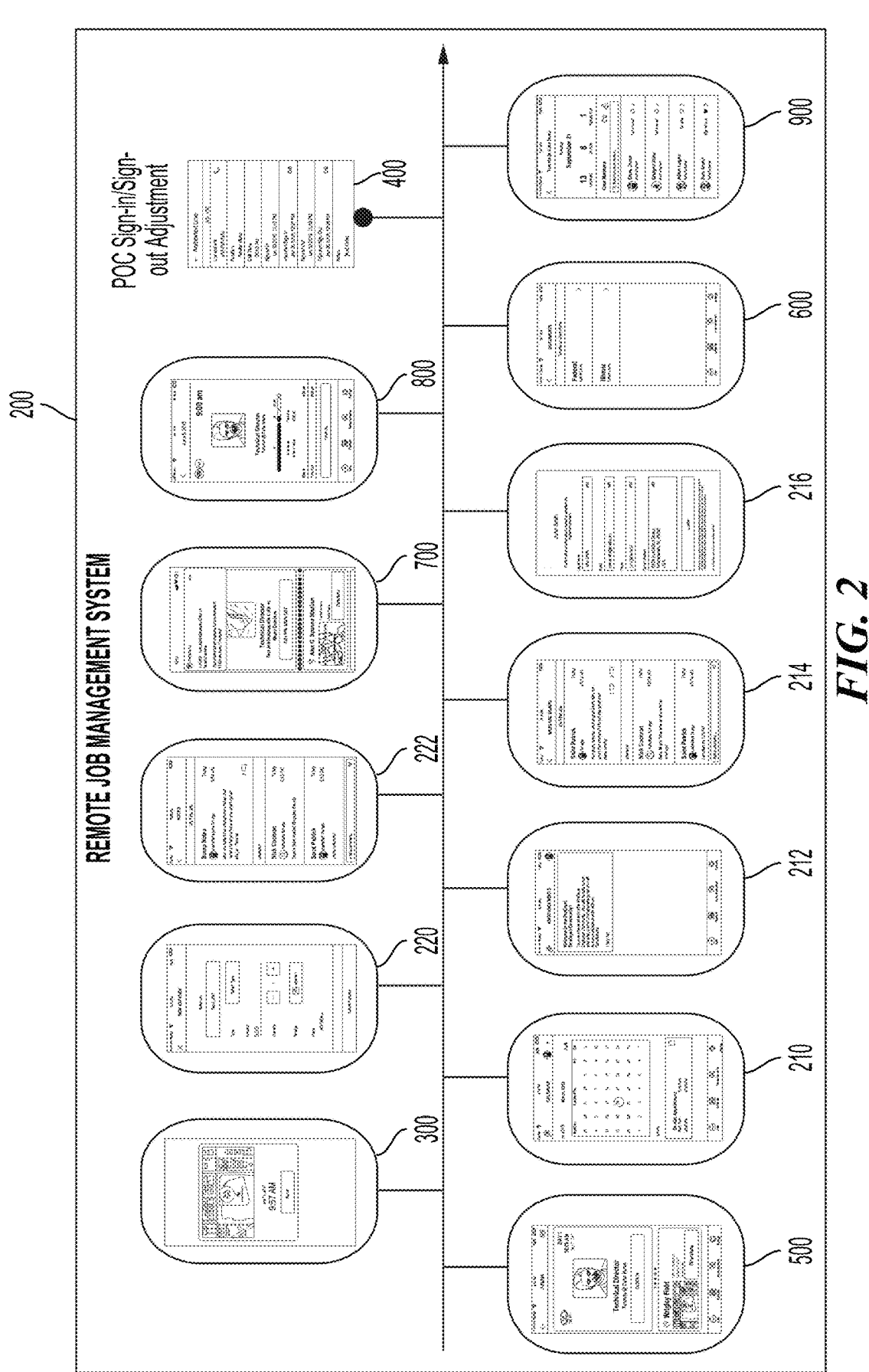
FIG. 2 is a block diagram further illustrating the remote employment management system of FIG. 1D, according to aspects of the present disclosure.

FIG. 2 is a block diagram further illustrating the remote employment management system 200 of FIG. 1A, according to aspects of the present disclosure. The remote employment management system 200 involves a comprehensive technology for enabling companies to manage staff on a daily basis without time clocks or paper based requests. In this configuration, the remote employment management system 200 includes a location-based clock in/out module 300, for example, as described with reference to FIGS. 3A-3C. One possible use for a geo-fenced remote clock-in/clock-out verification of the remote employment management system 200 is a film crew for a sporting event at a sporting stadium (e.g., Wrigley Field in Chicago, Illinois).

In one configuration, the remote employment management system 200 includes a job detail module 500 configured to provide employee access to job information, for example, as described with reference to FIGS. 5A-5B. In this configuration, the remote employment management system 200 also includes an event and personal calendar module 210, configured to quickly find jobs by date, as well as to create and manage personal events and add them to the calendar. The remote employment management system 200 further includes a company-wide announcements module 212 configured to send announcements to all employees, as well as push notification alerts of users for new announcements.

The remote employment management system 200 further includes a job related message board module 214. The job related message board module 214 is configured to provide crew members with direct access to the crew coordinator (e.g., crew manager), including sending and receiving notes. The job related message board module 214 relies on push notification for alerting users of newly received notes. The job related message board module 214 enables the point-of-contact (POC) and crew managers to send notes directly from the mobile application to any member of the crew (e.g., a film crew at a sports venue). In addition, crew members can post and comment on job related and social activities using the job related message board module 214. In addition, push notifications alert users of new message board posts and comments.

Figure 4A:
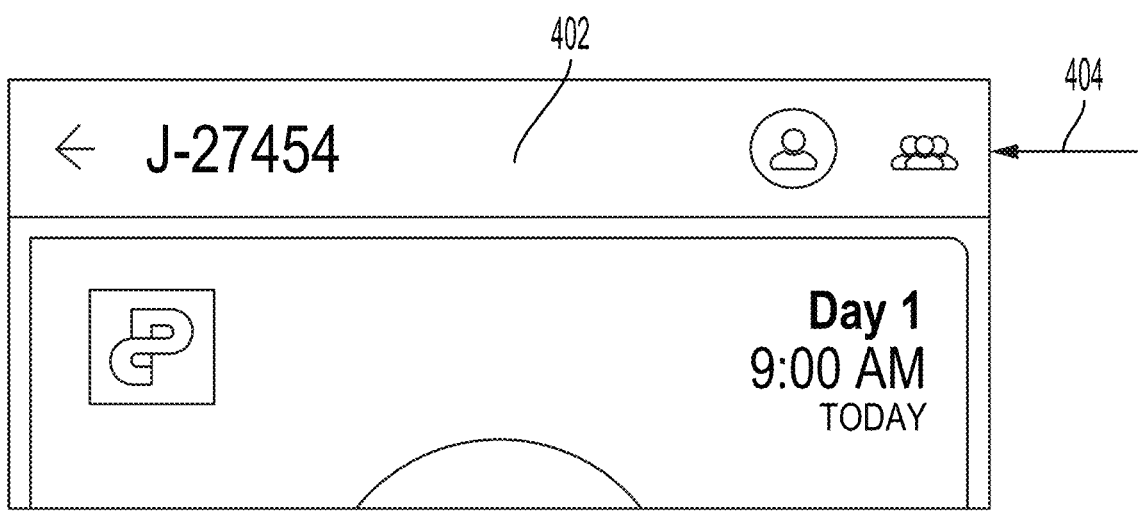
FIGS. 4A-4C are diagrams illustrating one implementation of the point-of-contact (POC) sign-in/sign-out adjustment module of the remote employment management system of FIG. 2, according to aspects of the present disclosure.
Figure 4B:
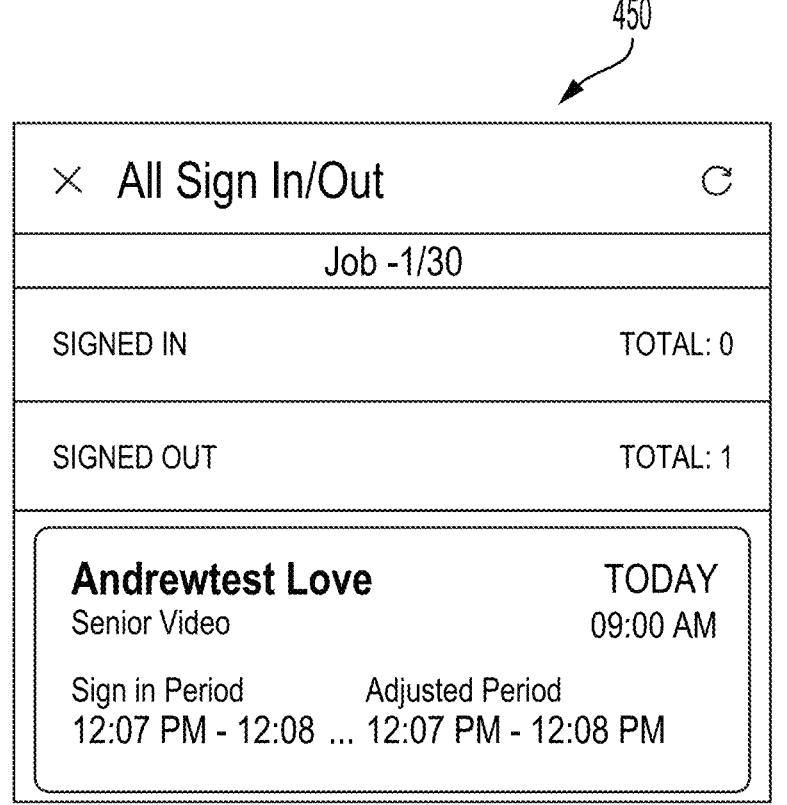
Figure 4C:

The remote employment management system 200 also includes an employee sign up and registration module 216 as well as a federal and state labor laws module 600, for example, as described with reference to FIG. 6. In addition, the remote employment management system 200 includes an expense submission and approval module 220, a direct communication with crew coordinator module 222, and a push notifications and direct links module 700, for example, as described in FIG. 7. The remote employment management system 200 also includes a detailed employee pay summary module 800, for example, as shown in FIG. 8. The remote employment management system 200 also includes a POC sign-in/sign-out adjustment module 400, for example, as shown in FIGS. 4A-4C, and an on-site crew management module 900, for example, as shown in FIG. 9.

As shown in FIG. 1D, the remote employment management system 200 includes an employment database (e.g., the cloud database 240) configured to generate a clock-in/clock-out record for a remote employee. For example, the remote employment management system 200 generate a clock-in/clock-out record in the cloud database 240 in response to the geo-fenced remote clock-in/clock-out verification of the mobile device 110 of the remote employee. That is, the cloud database 240 is configured to perform a login/logout of the remote employee into/from the remote employment management system 200 when a current time is within a predetermined amount of time before or at a start time, or at or after an end time.

Figures 3A, 3B:
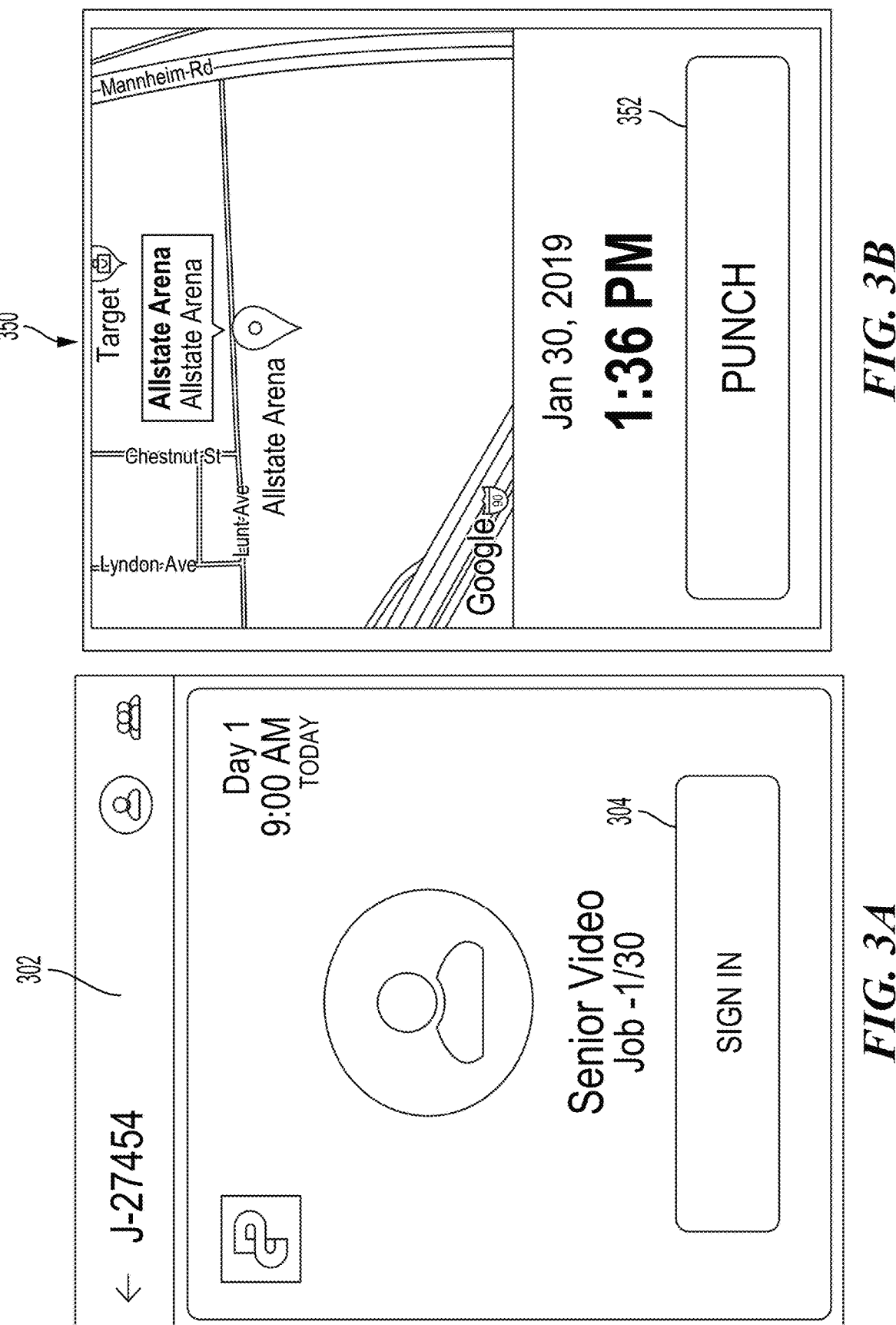
FIGS. 3A-3B are diagrams illustrating display screens for signing in and punching in for a remote job location of the remote employment management system, according to aspects of the present disclosure.

FIGS. 3A-3B are diagrams illustrating display screens for signing in and punching in for a remote job location of the remote employment management system 200, according to aspects of the present disclosure. FIG. 3A is a sign-in display screen 302 of a mobile device (e.g., 110) loaded with the remote employment management system 200, according to aspects of the present disclosure. In this example, the sign-in display screen 302 illustrates day one of a production job (e.g., J-27454), in which an an employee operates as senior video for a film production crew. In this example, the employee signs into the remote employment management system 200 by pressing a "SIGN IN" button 304. In this example, the user is allowed to sign into the remote employment management system 200 (e.g., at 9:00 AM) prior to reaching the remote job location, as shown in FIG. 3B.

FIG. 3B, is a punch-in display screen 350 of the mobile device (e.g., 110) loaded with the remote employment management system 200, according to aspects of the present disclosure. In this example, the remote job location is the Allstate Arena in Rosemont, Illinois. According to aspects of the present disclosure, the remote employment management system 200 activates the "PUNCH" button 352 once the mobile device is within a predetermined geo-fenced clock-in/clock-out verification area of the remote job location. In this example, the employee is within the predetermined geo-fenced clock-in/clock-out verification area of the Allstate Arena at 1:36 PM. In response to pressing of the "PUNCH" button 352, the remote employment management system 200 verifies the geo-location of the mobile device is within the predetermined geo-fenced clock-in verification area of the Allstate Arena.

In this configuration, the remote employment management system 200 relies on geo-fenced remote clock-in/clock-out verification to verify that employees are on site and on time to sign in and out of a remote job location. This geo-fenced verification prevents fraud as well as inaccurate timesheets. In addition, the geo-fenced verification sign-in/sign-out process does not monitor an employee location. This process is triggered by the employee when the employee arrives at the remote job location, which is also triggered by the mobile device (e.g., 110). In response to pressing the "PUNCH" button 352, the mobile device (e.g., 110) of the employee transmits a current geo-location of the mobile device.

According to aspects of the present disclosure, a server application (e.g., the distance API 290) applies a geo-fence location technology to verify the geo-location of the mobile device is within a geo-fenced clock-in/clock-out verification area of the remote job location. The geo-location of the mobile device may be provided with improve accuracy from a half-mile range to within a few feet of a determined longitude and latitude by the distance API 290. Once geo-fence location verification is complete and a current time is before or within a predetermined amount of time from a job start time, the employee is logged into the remote employment management system 200. This geo-fenced remote clock-in/clock-out verification eliminates manual time entry and excess paper use, which saves time and money. In addition, the remote employment management system 200 automatically updates a labor record (e.g., Salesforce Labor) with punch times of the remote employees.

Figure 3C:
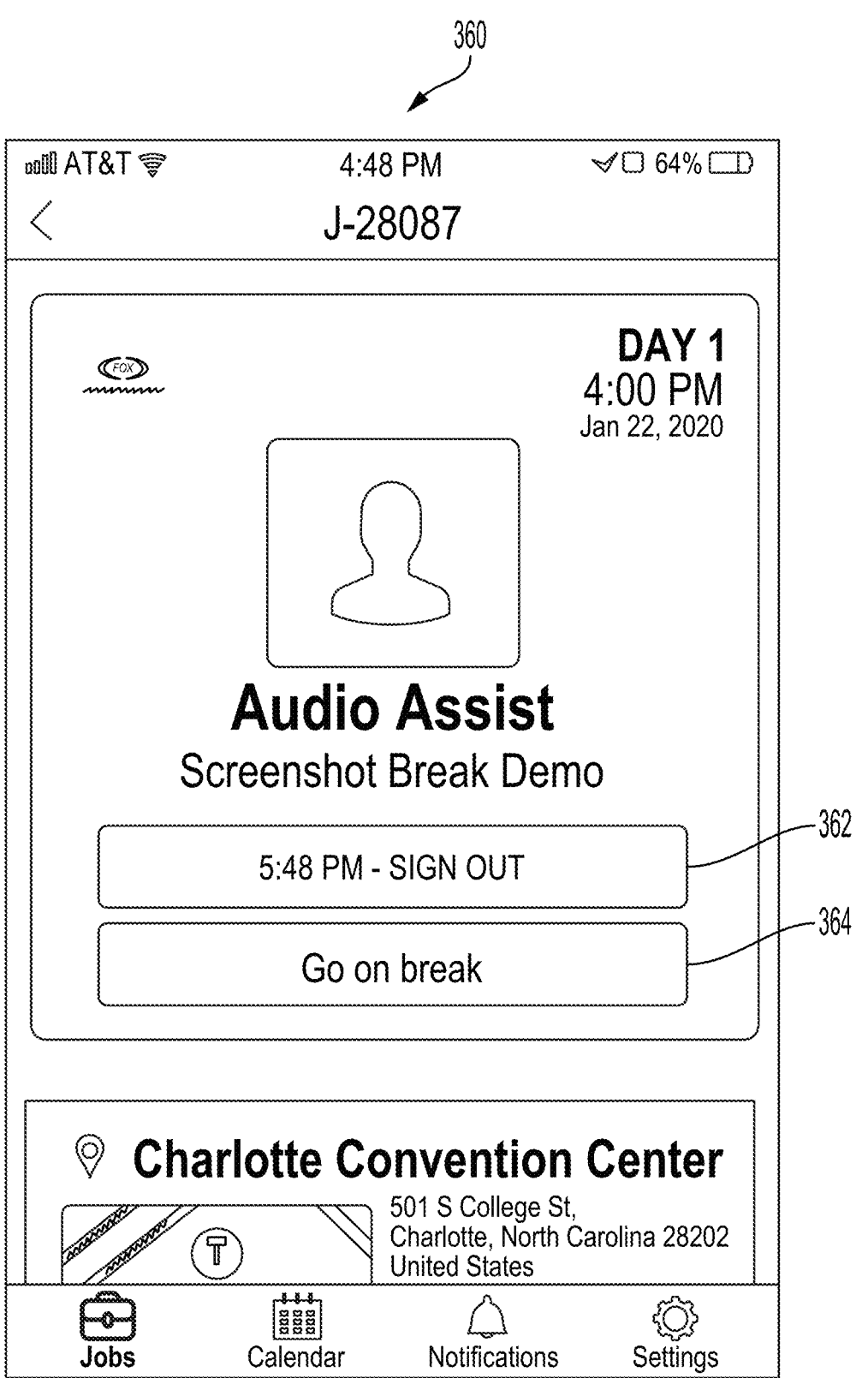
FIG. 3C is a break time function screen of the mobile device loaded with the remote employment management system, according to aspects of the present disclosure.

FIG. 3C is a break time function screen 360 of the mobile device (e.g., 110) loaded with the remote employment management system 200, according to aspects of the present disclosure. In this example, the remote job location is the Charlotte Convention Center in Charlotte, North Carolina, and the employee is an audio assistant. According to aspects of the present disclosure, if a coordinator of the employee has provided approval for an unpaid break, after sign-in, the "Go on Break" button 364 is activated on the break time function screen 360. The employee may record their break time using this function. In this example, starting a break will gray out the "SIGN-OUT" button 362 until the employee has ended his break. If the coordinator has not activated the break time function for the employee, the option is not available and the "Go on Break" button 364 is not available.

As shown in FIGS. 3A-3C, the geo-fence location verification process enables a scalable time entry based on automated rules. In order to sign in, the employee clicks on a job, then clicks on the "SIGN IN" button 304 of FIG. 3A. According to the geo-fence location verification process, an employee is within an allowed radius of a remote job location venue in order to punch in and out by pressing the "PUNCH" button 352 of FIG. 3B. That is, after the employee is within the allowed radius of the remote job location, the employee clicks on the "PUNCH" button 352 of FIG. 3B.

FIGS. 4A-4C are diagrams illustrating one implementation of the point-of-contact (POC) sign-in/sign-out adjustment module 400 of the remote employment management system 200, according to aspects of the present disclosure. In this aspect of the present disclosure, FIGS. 4A-4C are diagrams illustrating display screens for adjusting a sign in/out of employees working at a remote job location of the remote employment management system 200, according to aspects of the present disclosure. In the event that the employee forgot to punch in, the employee is instructed to punch in/out via a mobile application (APP) of the remote employment management system 200 so that there is a record, as shown in FIGS. 3A-3C. In addition, the employee is instructed to reach out to the POC to record the actual clock in/out times. If an employee is having trouble with punching via the APP of the remote employment management system 200, the employee is instructed to see the POC or contact their coordinator, such as a crew manager.

FIG. 4A is a job page display screen 402 of the mobile device (e.g., 110) loaded with a mobile application (APP) of the remote employment management system 200, according to aspects of the present disclosure. In this example, the job page display screen 402 illustrates day one of the job (e.g., J-27454). In this example, a point-of-contact (POC)/technology manager may view all sign ins/outs of the job by clicking on the people icon 404. Pressing the people icon 404 triggers an all sign in/out display screen 450, as shown in FIG. 4B.

In this example, the all sign in/out display screen 450 enables the POC/technology manager to view all employee sign ins/outs. The POC/technology manager begins an adjustment of the sign in/out of an employee by clicking on one of the entries of the all sign in/out display screen 450. This action triggers a record view display screen 470, as shown in FIG. 4C. As shown in FIG. 4C, the POC/technology manager adjusts the sign in of an employee by clicking on a sign in edit button 472. Similarly, the POC/technology manager adjusts the sign out of an employee by clicking on a sign out edit button 474.

In this configuration, the bottom of the record view display screen 470 includes a notes field 476. The notes field 476 enables the POC/technology manager to add any notes pertaining to the employee on the day in question. When complete, the POC/technology manager saves the record view display screen 470 to complete adjustment of the sign in/out of the employee. While adjustment of employee sign ins/outs is possible, it is preferred that the employee punch their own time. If an adjustment is made, the POC/technology manager is specified to update the notes field 476 with an explanation for the adjustment. The POC/technology manager may adjust the times for the employees but should only do so when it is determined that an employee's APP is not functioning properly or for special remote job locations that begin outside the venue.

Figures 5A, 5B:
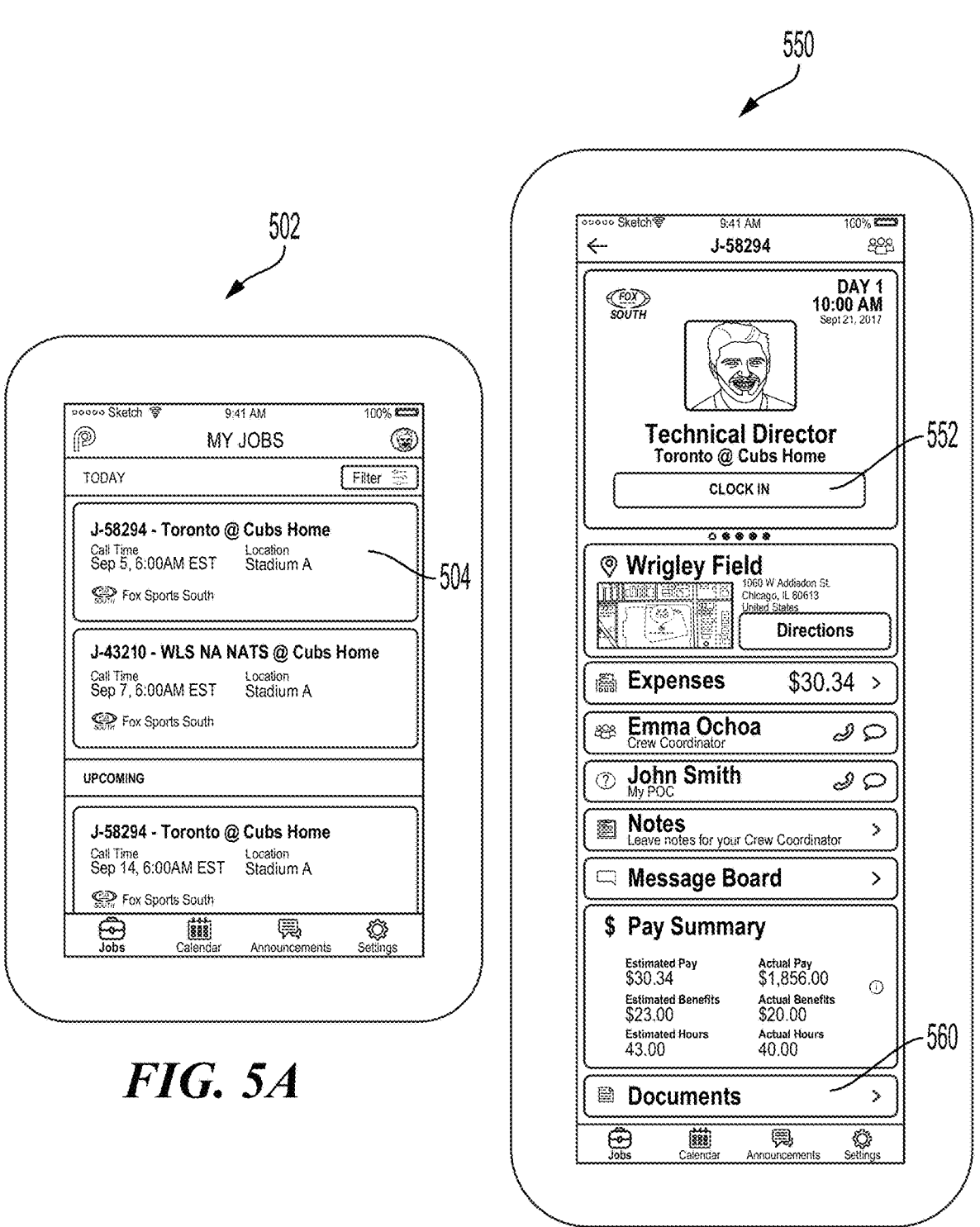
FIGS. 5A-5B further illustrate one implementation of the job detail module of the remote employment management system of FIG. 2, configured to provide employee access to job information according to aspects of the present disclosure.

FIGS. 5A-5B further illustrate one implementation of the job detail module 500 of the remote employment management system 200 configured to provide employee access to job information, according to aspects of the present disclosure. For example, FIG. 5A illustrates a job list screen 502, illustrating production jobs for today, as well as upcoming production jobs. In this example, a production job 504 (e.g., J-58294) is a Major League Baseball (MLB) game between the Toronto Blue Jays and the Chicago Cubs at Wrigley Field. A job detail screen 550, shown in FIG. 5B, is triggered by clicking on the production job 504 from the job list screen 502. In addition, the job list screen 502 includes the current remote location of the production job 504, as well as upcoming remote location jobs.

FIG. 5B illustrates the job detail screen 550, which further illustrates directions for the remote job location, expenses incurred by the employee during work at the remote job location, a crew coordinator (e.g., Emma Ochoa), a point-of-contact (POC) (e.g., John Smith), notes, a message board, a pay summary, and a documents icon 560 (e.g., labor law document access). Although described with regards to an MLB game, the remote employment management system 200 provides an end-to-end time and expense management system for other remote job locations. For example, the remote employment management system 200 may be used to manage a construction crew, in which a construction site is the remote job location. The end-to-end time and expense management system provided by the remote employment management system 200, as described in the present disclosure, is not limited to the examples provided and may support any remote job location.

Figure 6:
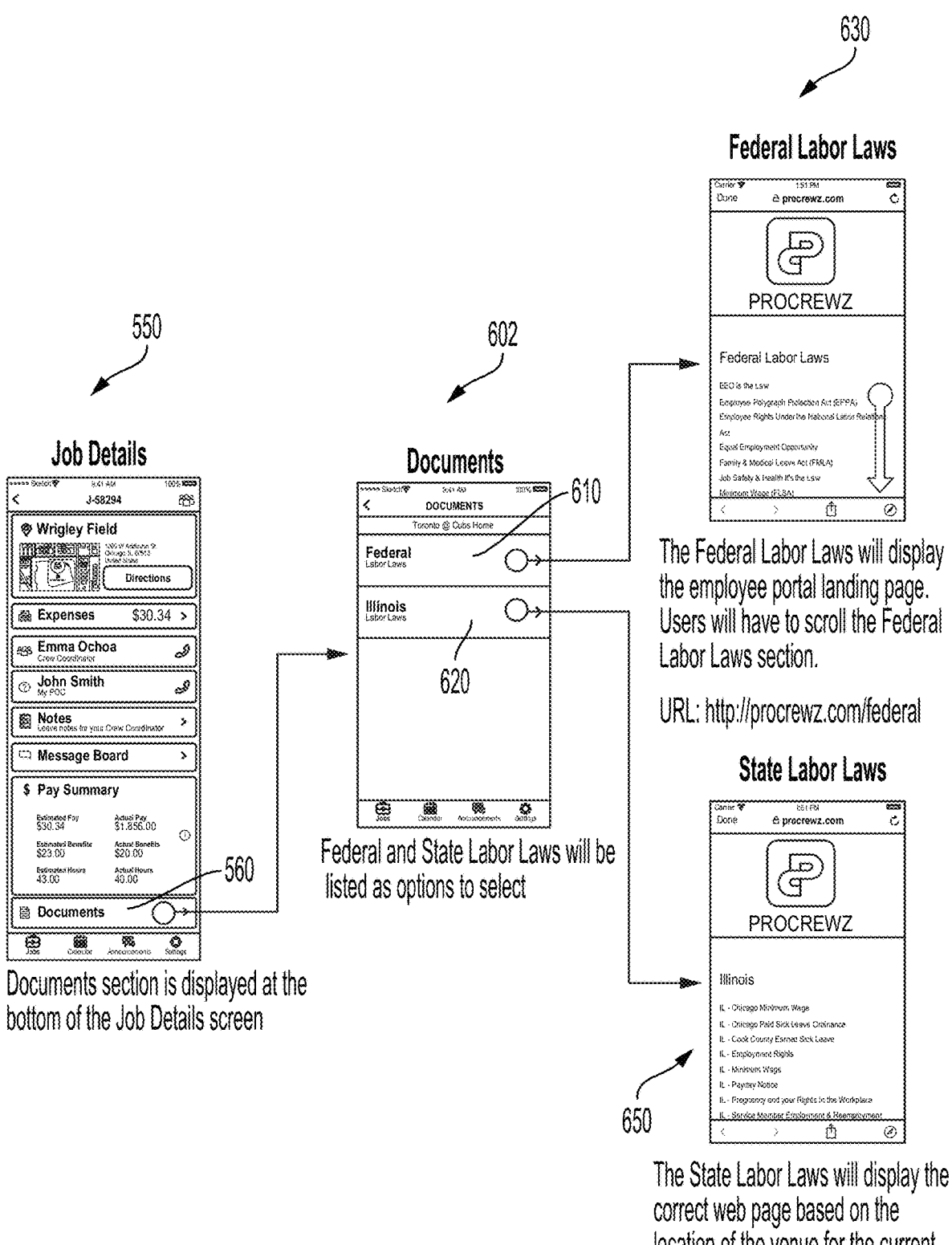
FIG. 6 illustrates one implementation of the federal and state labor laws modules of the remote employment management system of FIG. 2, configured to access and display federal and state labor laws based on a venue location, according to aspects of the present disclosure.

FIG. 6 illustrates one implementation of the federal and state labor laws module 600 of the remote employment management system 200 configured to access and display federal and state labor laws based on a venue location, according to aspects of the present disclosure. In one aspect of the present disclosure, the clock-in of the employee (see FIGS. 3A-3C) may trigger the remote employment management system 200 to access federal and state employment laws based on the remote job location. In this example, the user clicks on the documents icon 560 in the job detail screen 550 to trigger a documents screen 602. From the documents screen 602, the employee may click on a federal labor laws icon 610 or a state labor laws icon 620 (e.g., Illinois). The federal labor laws icon 610 triggers the display of a federal labor laws screen 630, and the state labor laws icon 620 triggers the display of a state labor laws screen 650 for Illinois. In an alternative configuration, a job location may be outside the predetermined geo-fenced clock-in verification area, such as a nearby location.

FIGS. 7A-7D illustrate implementations of the push notifications and direct links module 700 of the remote employment management system 200 configured to enable crew communication, according to aspects of the present disclosure. In this example, a job detail screen 702 is shown, including a notifications portion 710, a job information portion 720, and a job location portion 730. In this example, the notifications portion 710 indicates a current job (e.g., J-24819) as a technical director for a film crew of a National Football League (NFL) game between the Indianapolis Colts and the Miami Dolphins. The notifications portion 710 also indicates acceptance for an air travel expense reimbursement.

In this example, the job information portion 720 includes the noted job information, as well as a "SIGN OUT" button 722. The job location portion 730 provides a map 732 as well as a "Directions" button 734. The "SIGN OUT" button 722 triggers reporting a logout geo-location of the mobile device (e.g., 110) to the distance API 290 of the remote employment management system 200 to request clock-out, as shown in FIG. 1D. Requesting clock-out is conditioned on the logout geo-location being within a geo-fenced clock-in/clock-out verification area of the remote job location (e.g., Alex G. Spanos Stadium). In some aspects of the present disclosure, a crew member may engage an on-call feature by enabling their location when working outside their traditional location. This on-call feature allows a crew member to pick up extra work before they return to their traditional location.

Figure 7A:
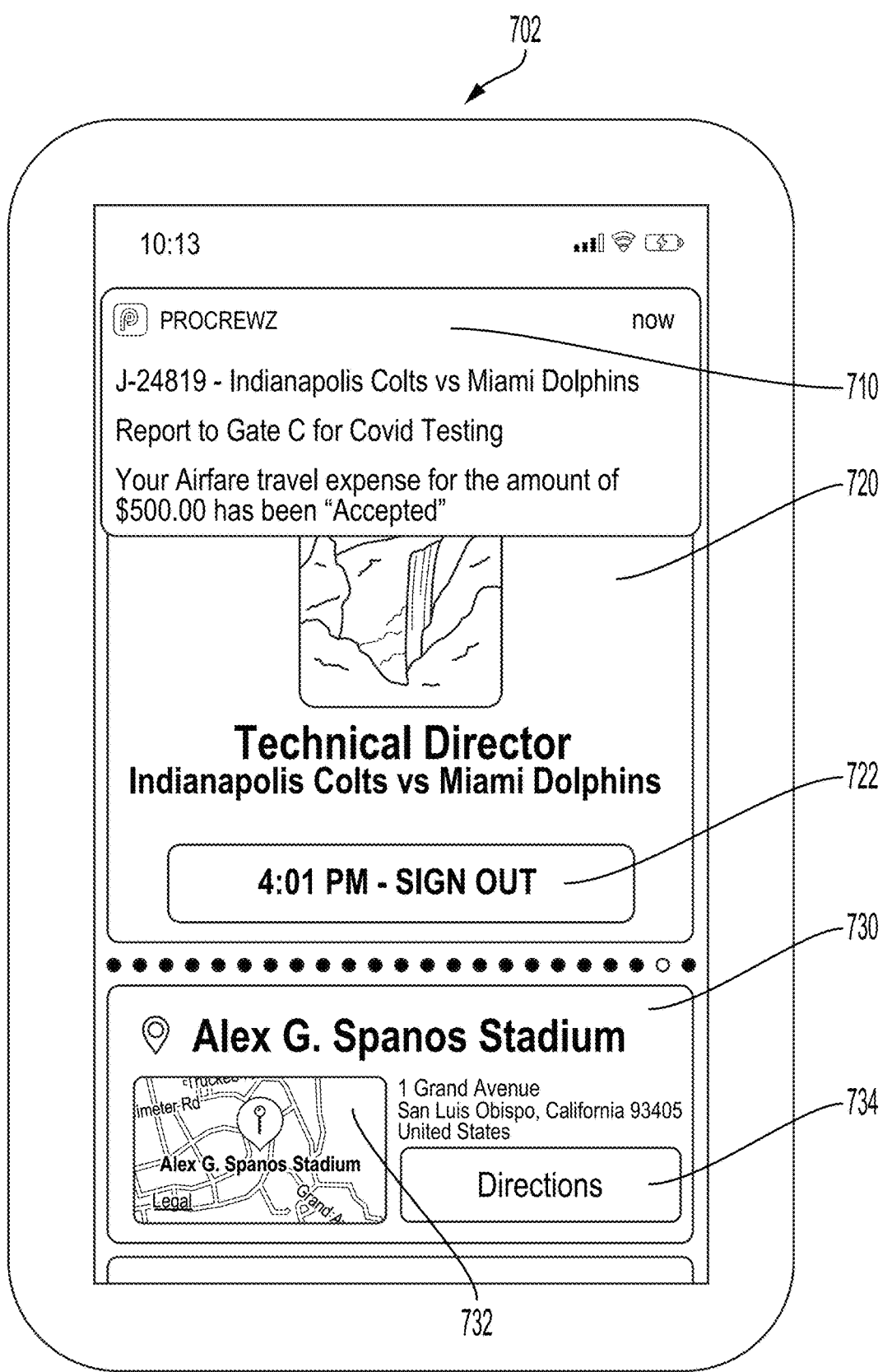
FIGS. 7A-7D illustrate implementations of the push notifications and direct links module of the remote employment management system of FIG. 2, configured to enable crew communication, according to aspects of the present disclosure.
Figures 7B, 7C:
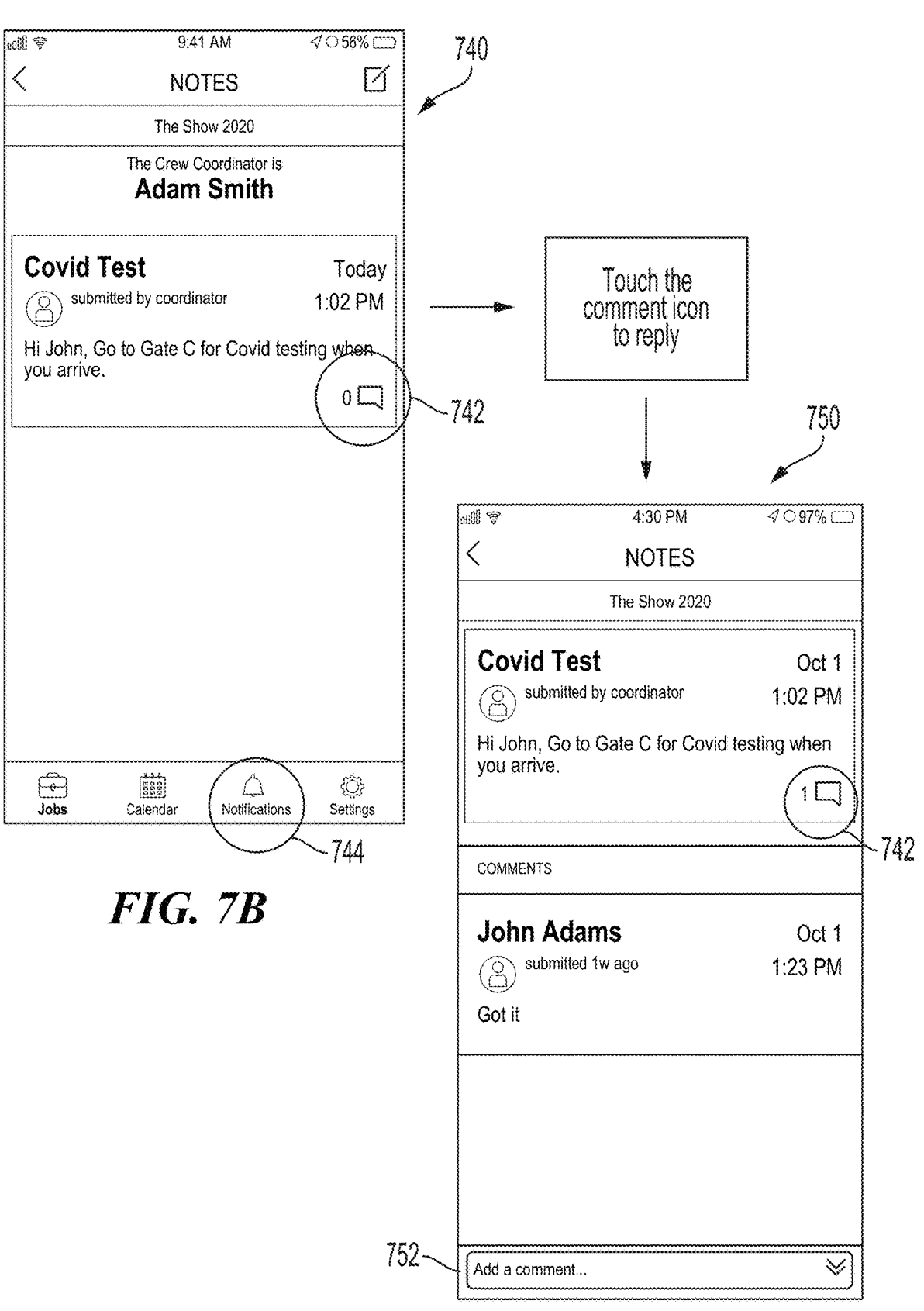

FIGS. 7B-7C illustrate notes screens used to read and respond to messages in the notifications portion 710 of the job detail screen 702 to enable crew communication, according to aspects of the present disclosure. In this example, the notes screen 740 enables a crew member (e.g., John) to read a message sent by a crew coordinator (e.g., Adam Smith). In this example, the message sent to the crew member involves a Covid Test, in which the crew member, John, is instructed to "Go to Gate C for Covid testing when you arrive." The message appears in the Notifications tab 744 at the bottom of the notes screen 740, as well as a number when there are unread messages. In addition, the notes screen 740 includes a comment icon 742 that display a number of comments to the messages.

Figure 7D:
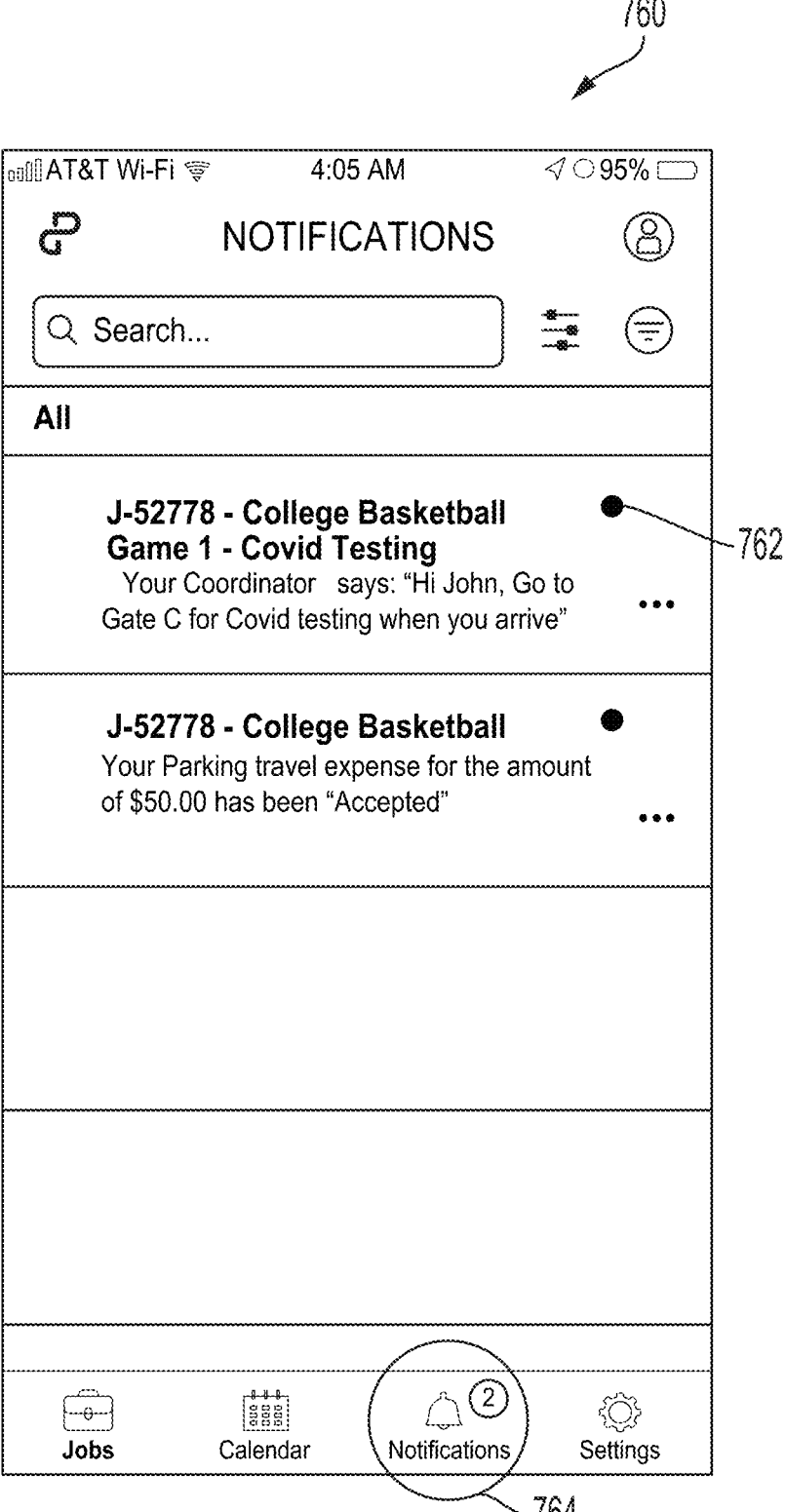

FIG. 7C illustrates a notes response screen 750 generated in response to clicking on the comment icon 742, which now illustrates one comment. In this example, replying to the message involves clicking on the comment icon 742 and typing in the comment field 752. In addition, FIG. 7D illustrates a notifications screen 760, which includes a number of unread message according to a notifications icon 764. Clicking on a message 762 triggers the notes screen 740 shown in FIG. 7A and the notes response screen 750, which is generated in response to clicking on the comment icon

742, which now illustrates one comment. The notifications screen 760 enables issuing a message to a production crew in response to detection of a positive test for a contagious disease at the remote job location. Notifications are provided by the remote employment management system 200 regarding job messages, job expense status, announcements, a job message board, and/or new assignments.

Figures 8A, 8B:
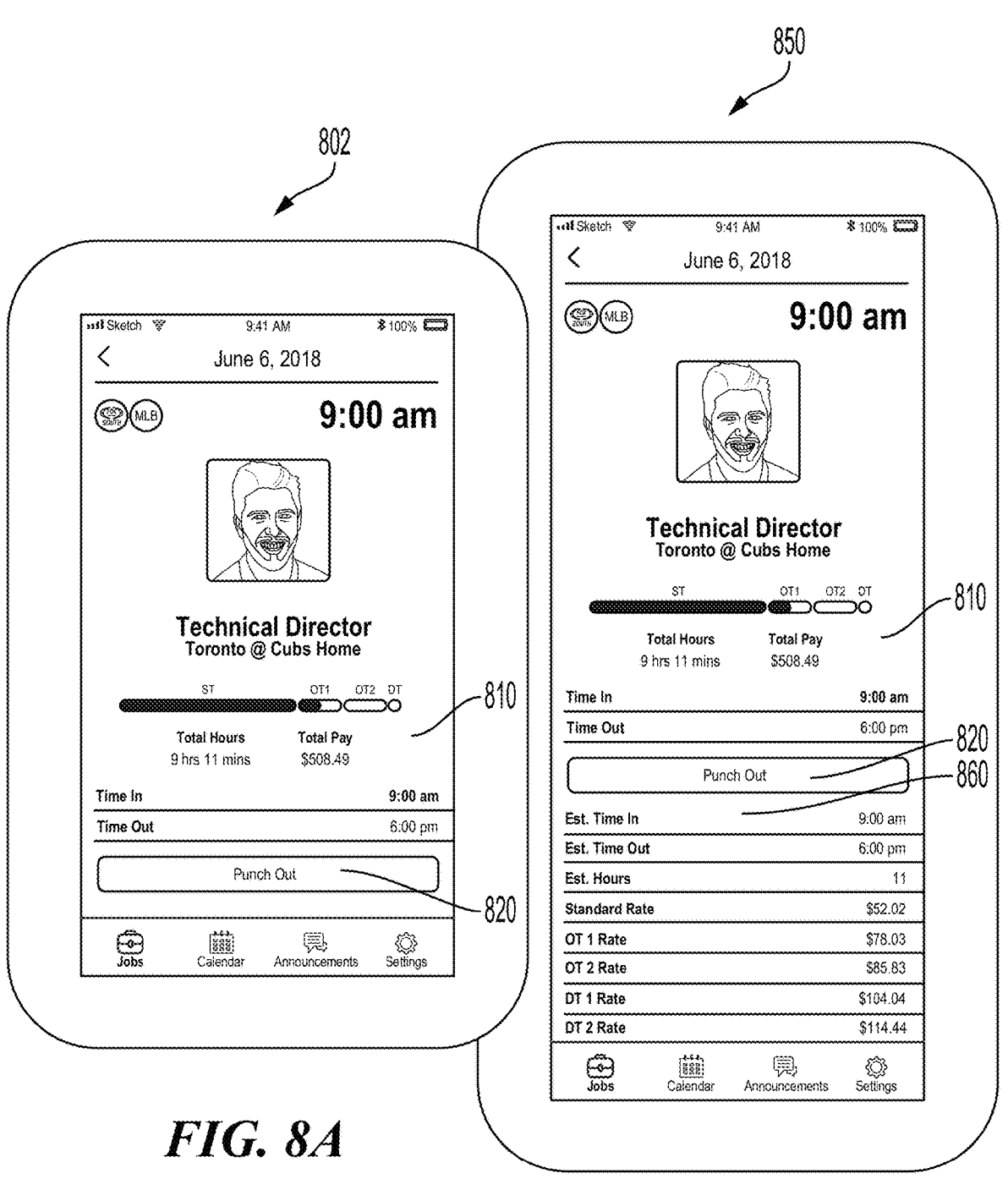
FIGS. 8A-8D illustrate implementations of the detailed employee pay summary module of the remote employment management system of FIG. 2, configured to provide detailed pay information, according to aspects of the present disclosure.

FIG. 8A-8D illustrate implementations of the detailed employee pay summary module 800 of the remote employment management system 200 configured to provide detailed pay information, according to aspects of the present disclosure. As shown in FIG. 8A, a job detail screen 802 displays a job information portion, including an estimated pay section 810, and a "Punch Out" button 820. As shown in FIG. 8B, a pay summary screen 850 is triggered by pressing the estimated pay section 810. The pay summary screen 850 includes a detailed pay summary portion 860, as well as the estimated pay section 810 and a "Punch Out" button 820. In this example, the employee is a technical director for a film crew of an MLB game between the Toronto Blue Jays at the Chicago Cubs, with an estimated pay of $508.49 at a first over time (OT 1 Rate). The employee's standard rate, overtime rates (OT 1 Rate, OT 2 Rate), and double time rates (DT 1 Rate, DT 2 Rate) are also shown.

Figures 8C, 8D:
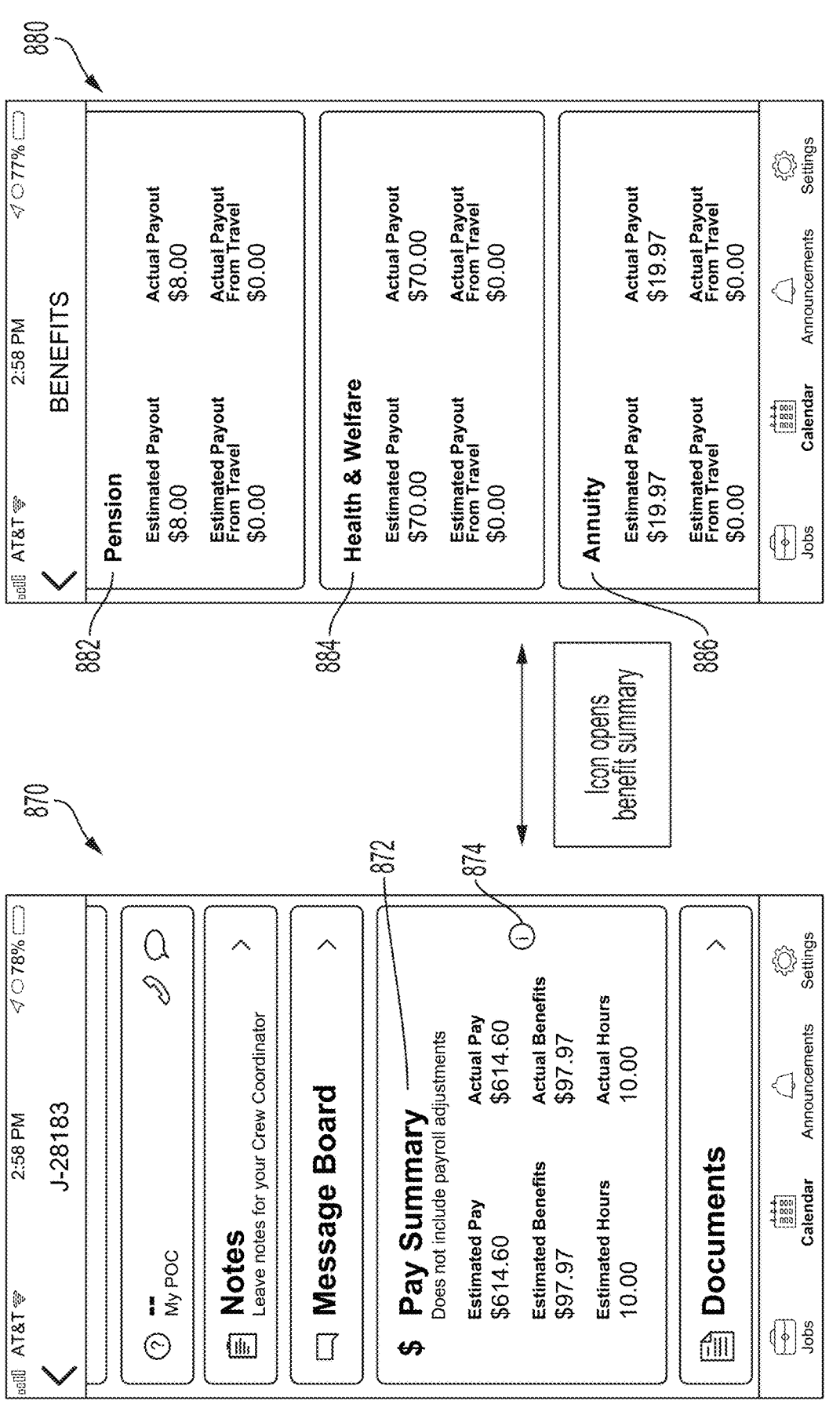
Figure 9:
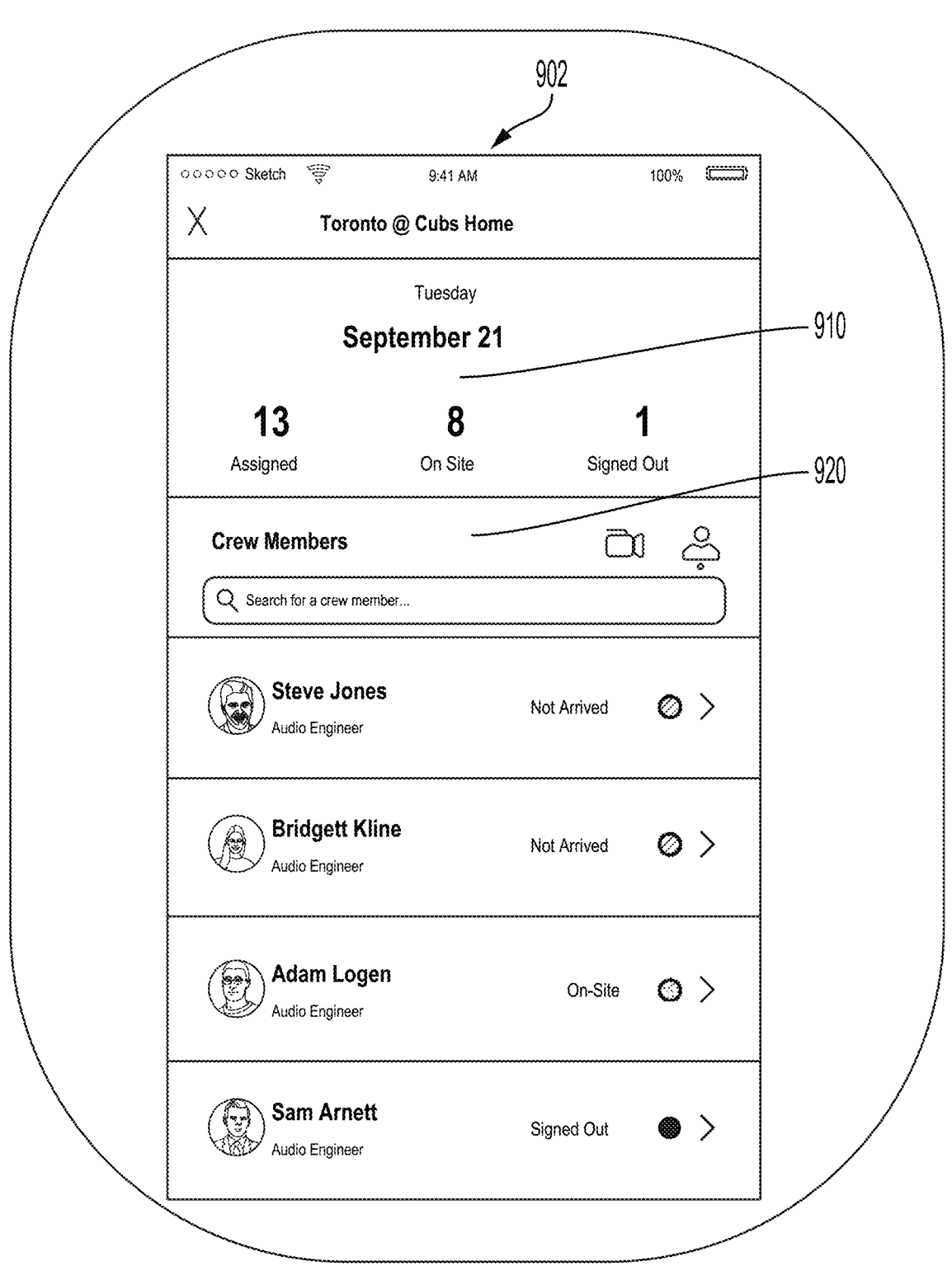
FIG. 9 illustrates one implementation of the on-site crew management module of the remote employment management system of FIG. 2, configured to provide detailed crew information, according to aspects of the present disclosure.

FIG. 8C-8D illustrate another implementations of the detailed employee pay summary module 800 of the remote employment management system 200 configured to provide detailed pay information, according to aspects of the present disclosure. As shown in FIG. 8C, a job detail screen 802 displays a pay summary section 872, as well as a notes, message board, and documents sections. In this example, the pay summary section 872 indicates an estimated pay amount of $614.60, an actual pay amount of $614.60, an estimated benefits amount of $97.97, an actual benefits amount of $97.97, an estimated hours amount of 10, and an estimated hours amount of 10 are shown.

As shown in FIG. 8D, a benefits screen 880 is triggered by pressing an information icon 874 of the pay summary section 872 of the job detail screen 802 shown in FIG. 8C. The benefits screen 880 includes a Pension section 882, a Health & Welfare section 884, and an Annuity section 886. The pay summary section 872 displays estimated pay and benefit totals. An estimate, based on any guaranteed hours or hourly rate, is displayed up until and after sign-in on a remote job. After sign-out, the pay summary section 872 is updated with the actual pay and benefit totals. To view the details of benefit payouts, the information icon 874 is clicked to open the benefits screen 880 displaying Pension, Health & Welfare, and Annuity totals. Clicking an arrow at the top left of the benefits screen 880 returns to return to the job detail screen 802.

In aspects of the present disclosure, the remote employment management system 200 automatically determines a jurisdiction, sales tax, and/or union benefits according to the remote job location and a remote job position of the employee at the remote job location. For example, the remote employment management system automatically determines a union pay rate for the employee according to the jurisdiction, sales tax, and/or union benefits determined according to the remote job location and the remote job position of the employee, for example, as shown in FIG. 8A-8D. the remote employment management system 200 generates a paycheck for the employee according to the jurisdiction, sales tax, and/or union benefits determined according to the remote job location and the remote job position of the employee.

FIG. 9 illustrates one implementation of the on-site crew management module 900 of the remote employment management system 200 configured to provide detailed crew information for a remote job location, according to aspects of the present disclosure. In this example, a crew management screen 902, a crew summary section 910 and a crew details section 920 are shown. For example, the crew management screen 902 includes crew member information for a film crew of an MLB game between the Toronto Blue Jays at the Chicago Cubs.

In aspects of the present disclosure, the crew management screen 902 enables an on-site point-of-contact (POC)/technology manager with control over the entire film crew. The remote employment management system 200 provides a mobile application for supporting the POC/technology manager in managing remote jobs using the crew management screen 902 as an essential tool used on-site. In aspects of the present disclosure, the remote employment management system 200 provides the POC/technology manager with a notification when employees sign in or out, as indicated by the crew summary section 910. The crew management screen 902 allows a POC/technology manager to access all jobs they are assigned to without having to create a labor record on that job. In addition, a POC/technology manager is assigned by day of each remote job. In one configuration, the crew management screen 902 allows viewing of a sign-in/sign-out record of a crew of the remote job location. In this configuration, crew management screen 902 enables the POC of the remote job location to adjust a sign-in/sign-out time of a crew member.

Figure 10A:
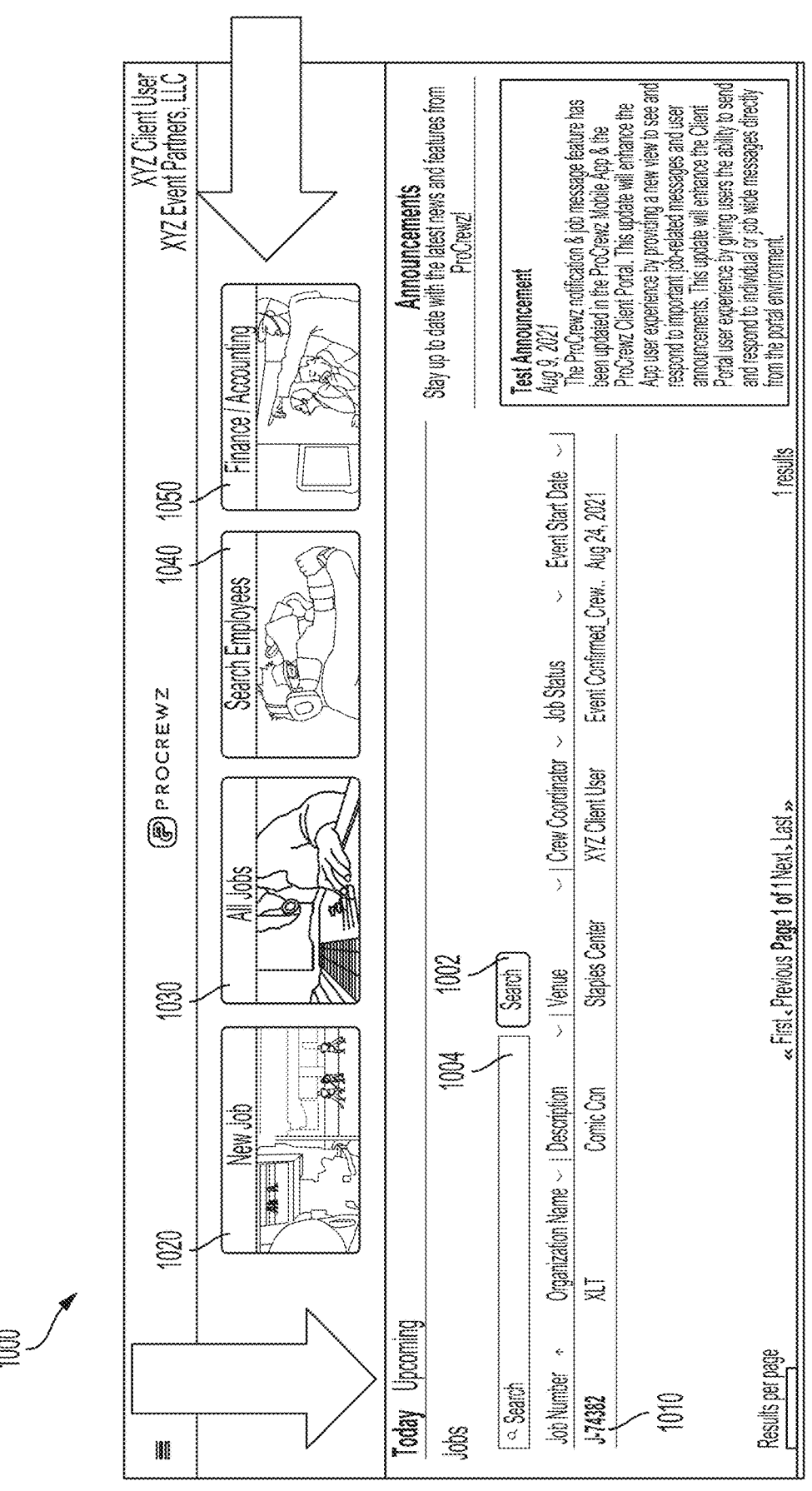
FIGS. 10A-10D illustrate implementations of the push notifications and direct links module of the remote employment management system of FIG. 2, configured to enable a multi-step crew job offer communication and acceptance process, according to aspects of the present disclosure.
Figure 10B:
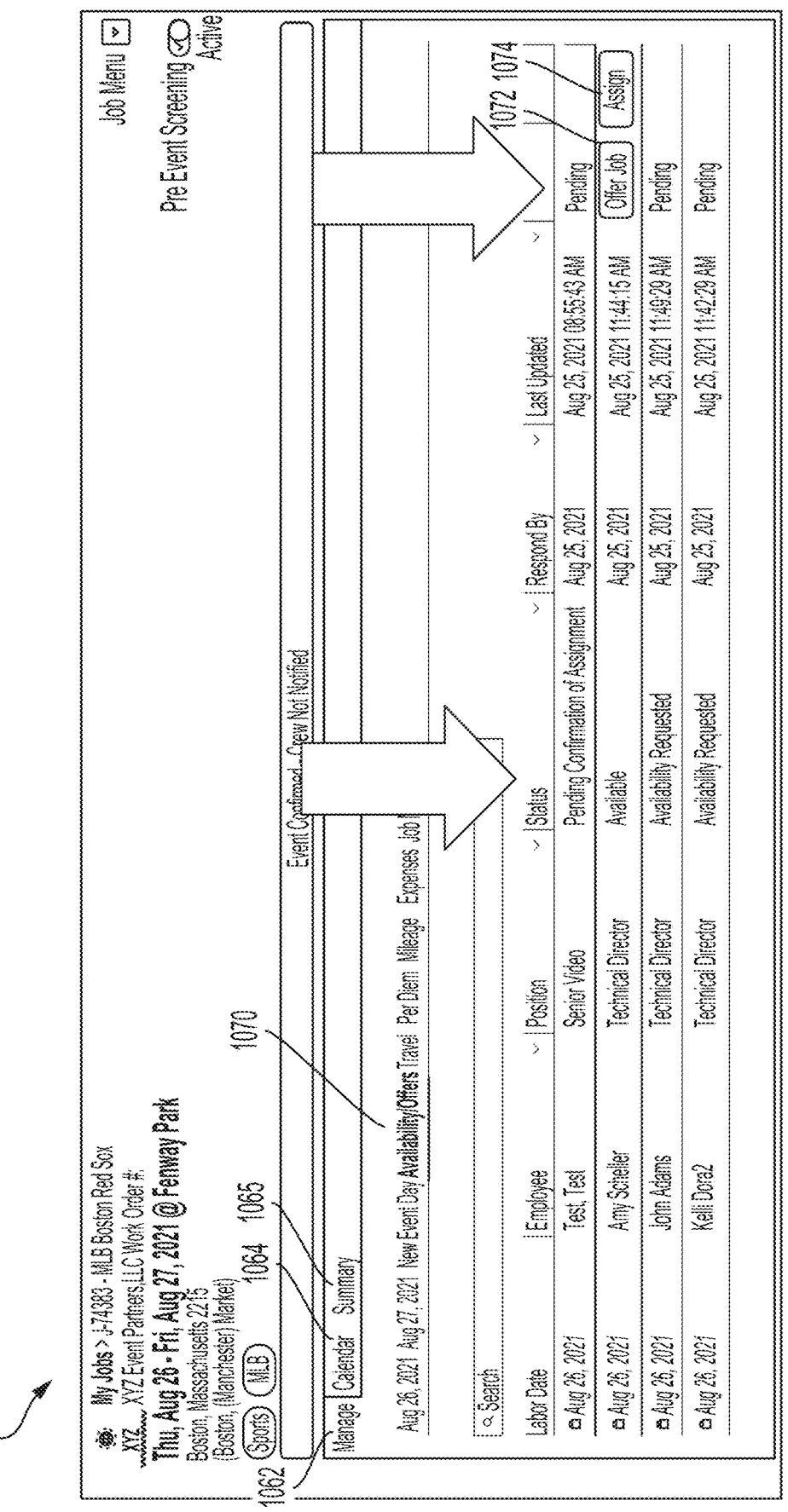

FIGS. 10A-10D illustrate implementations of the push notifications and direct links module 700 of the remote employment management system 200, configured to enable a multi-step crew job offer communication and acceptance process, according to aspects of the present disclosure. In this example, the job screen 1000 is shown, including a job search button 1002, in which a user types into a job search field 1004 allows searching for a specific job. In this example, the job screen 1000 also includes a New Job tab 1020, an All Jobs tab 1030, a Search Employees tab 1040, and a Finance/Accounting tab 1050. In addition, the job screen 1000 also lists a job, in which the user clicks on the highlighted Job Number 1010 (e.g, Job Number J74382) to generate a job detail screen, for example, as shown in FIG. 10B.

FIG. 10B illustrates a job detail screen 1060 generated in response to clicking the highlighted Job Number 1010 of FIG. 10A. As shown in FIG. 10B, the job detail screen 1060 includes a Manage tab 1062, a Calendar tab, and a Summary tab 1065. In this example, the Manage tab 1062 is active and an Availability/Offers column 1070 is selected to illustrate the multi-step job offer process. For example, a potential crew member Amy Scheller is selected and offered a job as a Technical Director using the Offer Job button 1072. Once Amy Scheller accepts the job offer and becomes a crew member, she may be assigned the Technical Director position using the Assign button 1074. In aspects of the present disclosure, pressing of the Offer Job button 1072 triggers a job offer detail screen, for example, as shown in FIG. 10C.

FIG. 1080C illustrates a job offer detail screen 1080 generated in respond to pressing of the Offer Job button 1072 of FIG. 10B, according to aspects of the present disclosure. In this example, Amy Scheller views the job offer detail screen 1080 as a mobile application on her mobile device regarding a Senior Video position. In addition, the job offer detail screen 1080 includes a Not Available button 1082, a Message button 1084, and a View button 1086 for responding to the job offer presented by the job offer detail screen 1080. In this example, Amy presses the View button 1086 to view to the job offer and trigger a job acceptance/denial screen, for example, as shown in FIG. 10D.

Figures 10C, 10D:
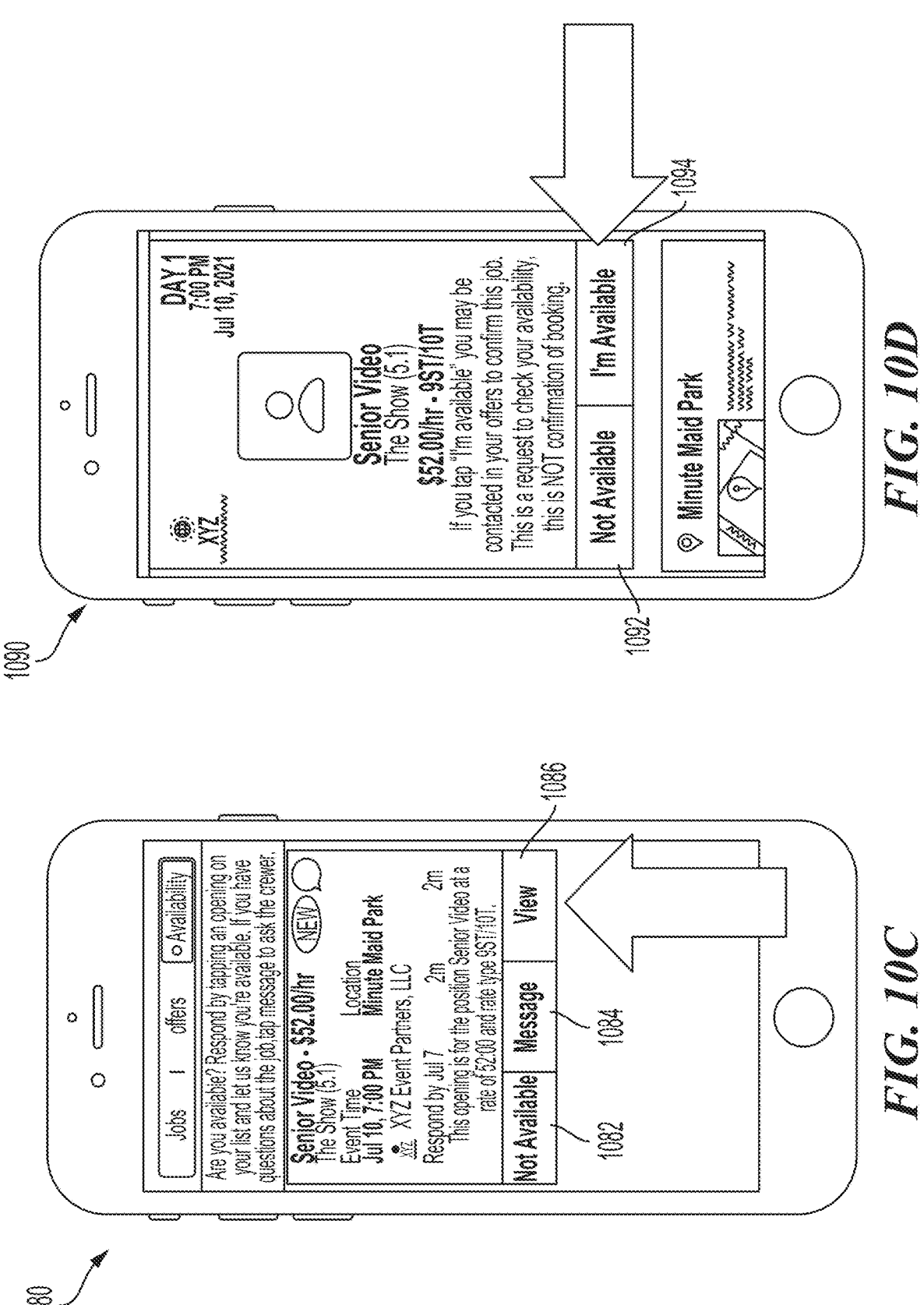

As shown in FIG. 10D, a job acceptance/denial screen 1090 is generated in response to presses the View button 1086 of FIG. 10C, in this aspect of the present disclosure. In this example, the job acceptance/denial screen 1090 includes a Not Available button 1092 and an I'm Available button 1094. For example, if Amy decides to accept the job offer of Senior Video, Amy presses the I'm Available button 1094; otherwise, Amy presses the Non Available button 1092. In example, presses the I'm Available button 1094 and accepts the job offer of the Senior Video position.

FIGS. 11A and 11B illustrate calendar view screens generated in response to a Calendar tab 1064 of the job detail screen 1060 of FIG. 10B, according to aspects of the present disclosure. In aspects of the present disclosure, the calendar view screen 1100 enable the addition and/or edit of the crew members assigned to the various positions, as view on a day-by-day basis. As shown in the calendar edit screen 1150, Amy Scheller is assigned the Technical Direct position for Day 2 and Day of the production job. In addition, Kelli Dora2 is assigned the Audio Assist position for Day 1, Day 2, Day 3 of the production job.

According to aspects of the present disclosure, the job screen 1000, the job detail screen 1060, the job offer detail screen 1080, and the job acceptance/denial screen 1090 enable offer, acceptance, and assignment of a production job. In these aspects of the present disclosure, the various job screen provide a detailed chain of a multi-step crew job offer communication, acceptance, and production job assignment process, according to aspects of the present disclosure. This detailed accounting provided by the chain of the multi-step crew job process provides a log of an online hiring process that is not available using conventional means. In the event of a failure to report to a remote job, or in the case of an on the job injury, the detailed chain of the multi-step crew job offer process may be reviewed to resolve any issues.

FIGS. 12A-12B illustrate implementations of the push notifications and direct links module 700 of the remote employment management system 200, configured to enable crew communication, according to aspects of the present disclosure. In this example, a job message screen 1200 enables selection of a crew member, John Adams, as the recipient of a job message by typing a message in the message field 1210. In this example, John is instructed to check in at Gate C for Covid testing. As shown in FIGS. 7B-7C, the notes screen 740 enables a crew member (e.g., John) to read a message sent by a crew coordinator (e.g., Adam Smith). In this example, the message sent to the crew member involves a Covid Test, in which the crew member, John, is instructed to "Go to Gate C for Covid testing when you arrive." The message appears in the Notifications tab 744 at the bottom of the notes screen 740, as well as a number when there are unread messages. In addition, the notes screen 740 includes a comment icon 742 that display a number of comments to the messages. FIG. 7D illustrates a notifications screen 760, which includes unread message according to a notifications icon. Clicking on a the message 762 triggers the notes screen 740 shown in FIG. 7A and the notes response screen 750, which is generated in response to clicking on the comment icon 742, which now illustrates one comment.

FIG. 12B illustrates an employee certifications screen 1250 generated in response to clicking on a crew member. In this example, crew member John Adams is selected to determined John's employment certification. As shown, John is not certified for a COVID-19 Proof of Vaccination. As shown in FIGS. 7B-7C, the notes screen 740 enables a crew member (e.g., John) to read a message sent by a crew coordinator (e.g., Adam Smith). In this example, the message sent to the crew member involves a Covid Test, in which the crew member, John, is instructed to "Go to Gate C for Covid testing when you arrive." The message appears in the Notifications tab 744 at the bottom of the notes screen 740, as well as a number when there are unread messages. In addition, the notes screen 740 includes a comment icon 742 that display a number of comments to the messages. FIG. 7D illustrates a notifications screen 760, which includes unread message according to a notifications icon. Clicking on a the message 762 triggers the notes screen 740 shown in FIG. 7A and the notes response screen 750, which is generated in response to clicking on the comment icon 742, which now illustrates one comment.

The job message screen 1200 enables issuing a message to a production crew in response to detection of a positive test for a contagious disease at the remote job location. Notifications are provided by the remote employment management system 200 regarding job messages, job expense status, announcements, a job message board, and/or new assignments. The manage job screen 1000 also includes a travel tab (not-shown). According to further aspects of the present disclosure, the remote employment management system 200 arranges transportation crew members of a production crew prior to the predetermined start date using the travel tab. In these aspects of the present disclosure, arrangement of transportation is provided through the mobile application to the crew members.

Figures 13A, 13B, 13C, 13D:
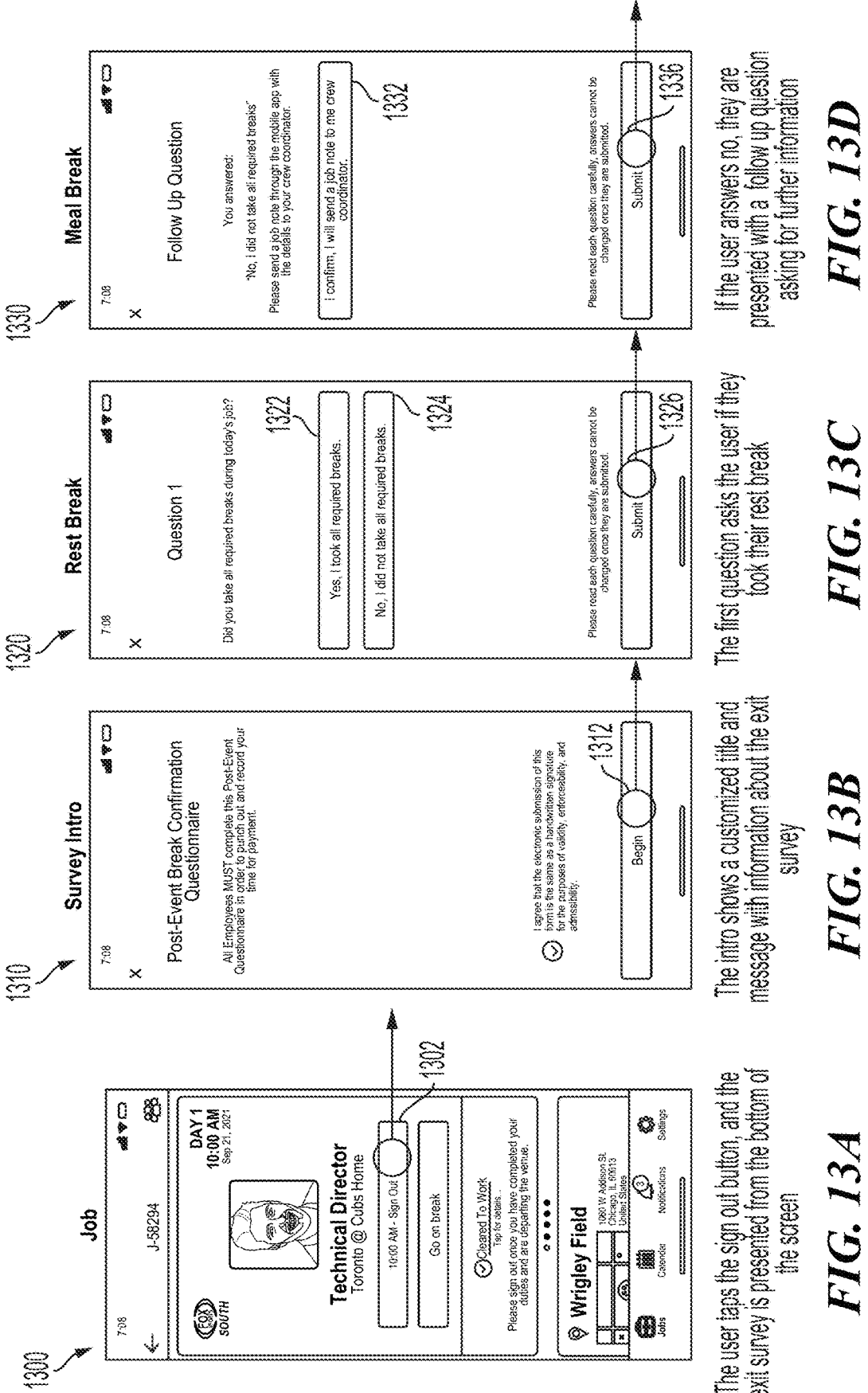
FIGS. 13A-13G illustrate a post event survey sign out flow, illustrating an end result experience following sign out of a mobile application implementing the remote employment management system of FIG. 2, according to aspects of the present disclosure.

FIGS. 13A-13G illustrate a post event survey sign out flow, illustrating an end result experience following sign out of a mobile application implementing the remote employment management system of FIG. 2, according to aspects of the present disclosure. The post-event sign out flow begins at a job screen 1300, in which a user taps a sign out button 1302. FIG. 13B illustrates a survey introduction screen 1310 presented to the user in response to tapping of the sign out button 1302 of the job screen 1300 of FIG. 13A. The survey introduction screen 1310 informs the user regarding a post-event break confirmation questionnaire, which all employees must complete in order to punch out and record their time for payment. The user initiates completion of the post-event survey by tapping on a begin button 1312.

FIG. 13C illustrates a rest break screen 1320 presented to the user in response to tapping on the begin button 1312 of the survey introduction screen 1310 of FIG. 13B. In this example, the rest break screen 1320 provides a first question to the user to determine whether the user took all requested breaks during the day's job. The user taps a first button 1322 to confirm the user took all requested breaks for the day's job. Otherwise, the user taps a second button 1324 to indicate the user did not take all requested breaks for the day's job. The user submits their response to the rest break screen 1320 by pressing a submit button 1326.

FIG. 13D illustrates a meal break screen 1330 presented to the user in response to tapping on the second button 1324 of the rest break screen 1320 of FIG. 13C, indicating the user did not take all requested breaks for the day's job. In this example, the user is asked to confirm that the user will send a job note to the crew coordinator in response to the user's indication of failing to take all breaks for the day's job. The meal break screen 1330 presents a follow up question to the user, asking for further information. The user submits their response to the meal break screen 1330 by pressing a submit button 1336.

Figures 13E, 13F, 13G:
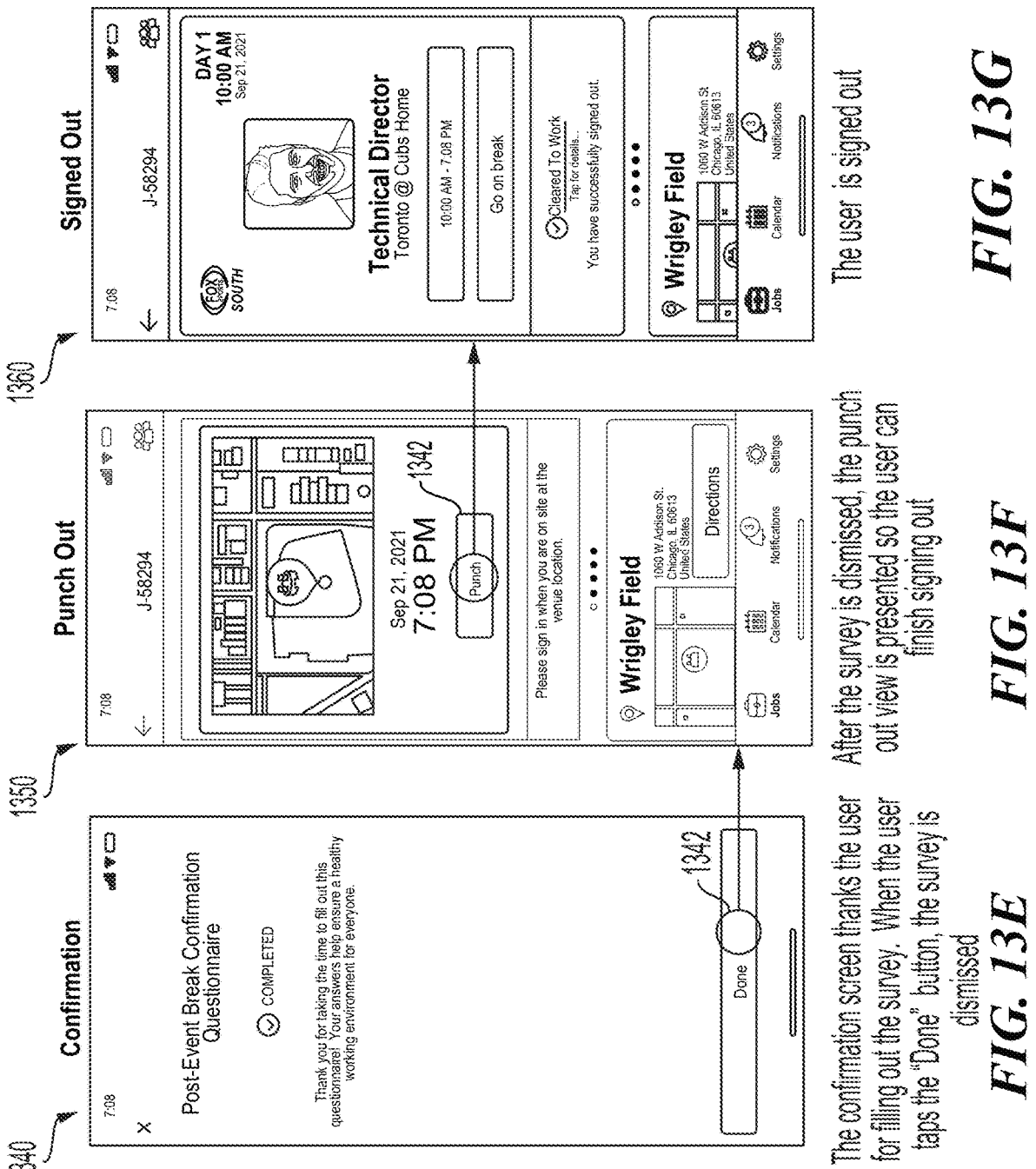

FIG. 13E illustrates a confirmation screen 1340 presented to the user in response to tapping on the first button 1322 of the rest break screen 1320 of FIG. 13C or the submit button 1336 of the meal break screen 1330 of FIG. 13D. In this example, the confirmation screen 1340 thanks the user for filling out the survey. When the user taps the done button 1342, the survey is dismissed. FIG. 13F illustrates a punch out screen 1350 presented to the user in response to tapping on the done button 1312 of the confirmation screen 1340 of FIG. 13F. In this example, after the survey is dismissed, the punch out screen 1350 is present so the user can finishing signing out by tapping the punch out button 1352. FIG. 13G illustrates a signed out screen 1360 presented to the user in response to tapping on the punch out button 1352 of the punch out screen 1350 of FIG. 13F.

Figures 14A, 14B, 14C:
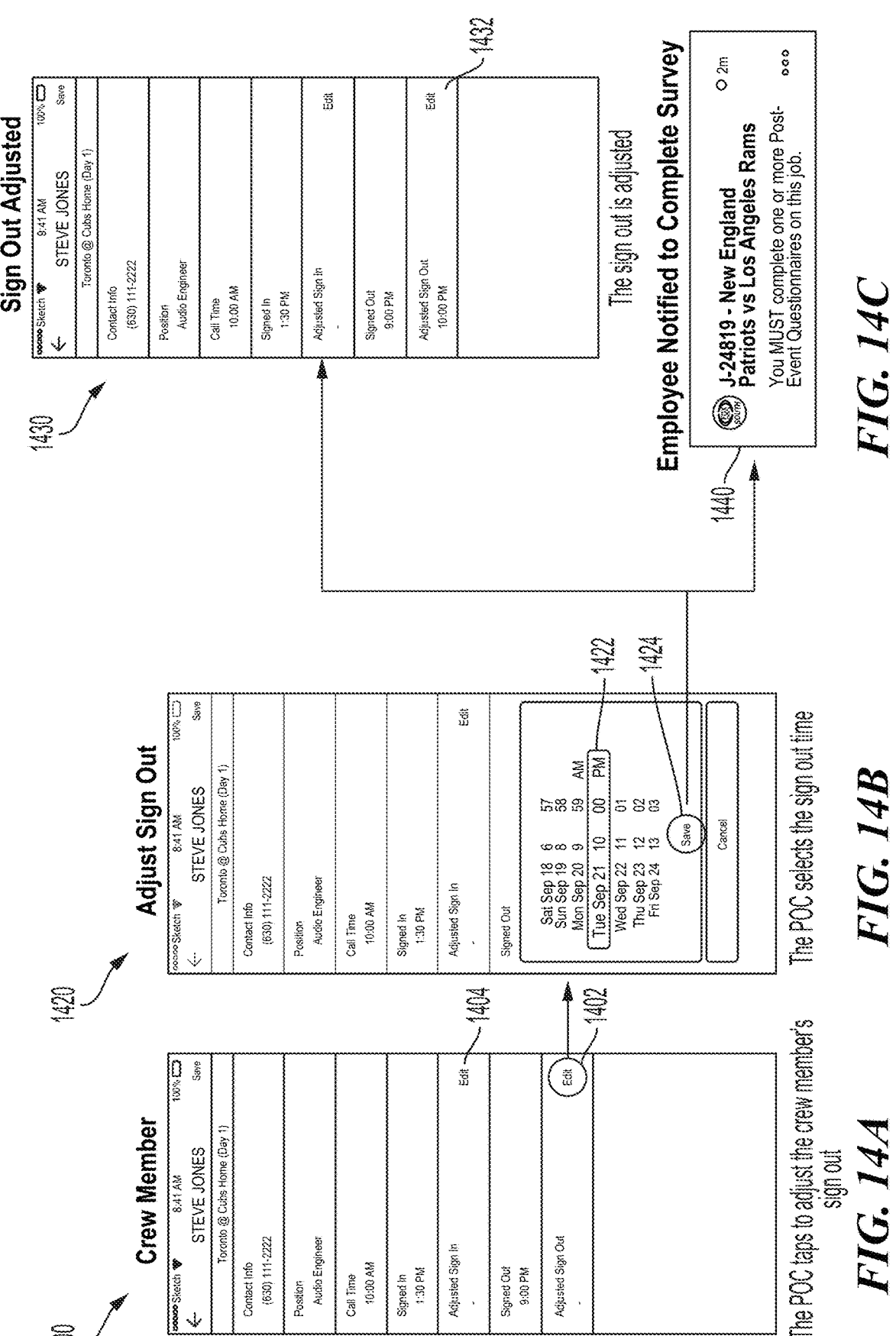
FIGS. 14A-14H are diagrams illustrating display screens used by a point of contact (POC) for adjusting a sign in/out of a crew member of the remote employment management system of FIG. 2 and initiating a post-event questionnaire to be completed by the crew member to sign out, according to aspects of the present disclosure.

FIGS. 14A-14H are diagrams illustrating display screens used by a point of contact (POC) for adjusting a sign in/out of a crew member of the remote employment management system 200 that failed to sign out, which initiates a post-event questionnaire for the crew member to complete to sign out, according to aspects of the present disclosure. As shown in FIG. 14A, the POC accesses a crew member screen 1400 and adjusts a sign out of the crew member (e.g., Steve Jones) by tapping on an edit button 1402. In addition, the POC may adjust a sign in of the crew member by tapping on an edit button 1404. FIGS. 14A-14C further illustrate the implementation of the point-of-contact (POC) sign-in/sign-out adjustment module 400 shown in FIGS. 4A-4C of the remote employment management system 200, according to aspects of the present disclosure. In this aspect of the present disclosure, FIG. 14B illustrates an adjust sign out screen 1420 triggered in response to the POC tapping on the edit button 1402 of the crew member screen 1400 of FIG. 14A. The POC adjusts the crew member sign out by selecting a new sign out time 1422 and tapping on the save button 1424. FIG. 14C illustrates a sign out adjusted screen 1430, showing the adjusted sign out field 1432 (e.g., 10:00 PM) of the sign out adjusted screen 1430. In addition, an employee notification 1440 is triggered by POC selecting the new sign out time 1422 and tapping on the save button 1424 of the adjust sign out screen 1420. Triggering the notifications screen 1450 specifies that the employee must complete a post-event questionnaire regarding the job, as shown in FIGS. 14D-14H.

Figures 14D, 14E, 14F:
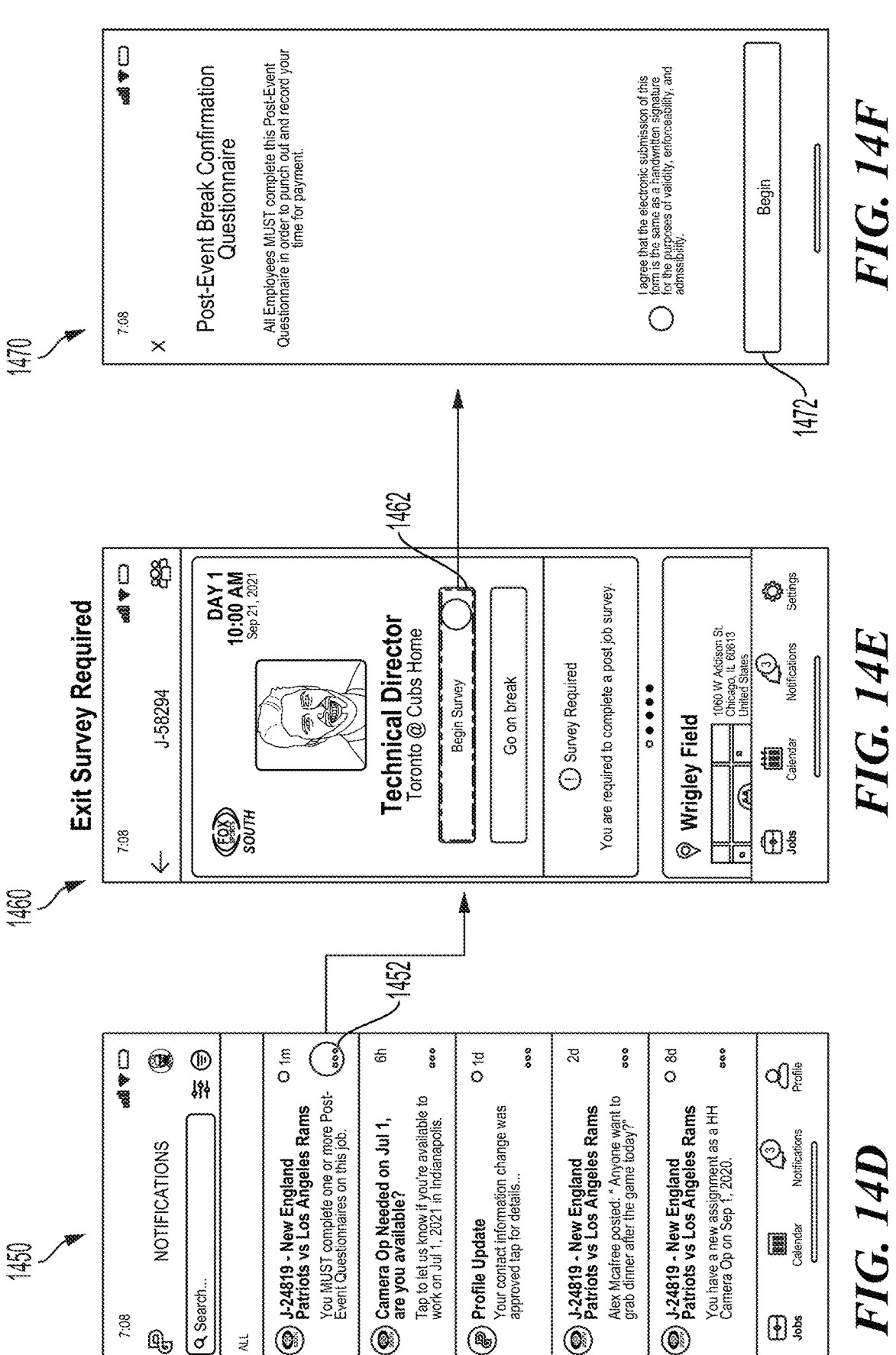

FIGS. 14D-14H are diagrams illustrating display screens used by a crew member to complete a post-event questionnaire in response to adjusting a sign in/out of the crew member, according to aspects of the present disclosure. FIG. 14D illustrates a notifications screen 1450, in which a crew member is notified of a request to complete a post-event questionnaire. In this example, the crew member responds to the notification by tapping on a button 1452 of the notifications screen 1450. FIG. 14E illustrates an exit survey required screen 1460 triggered by tapping on the button 1452 of the notifications screen 1450. The crew member initiates completion of the post-event questionnaire by tapping on a begin survey button 1462 of the exit survey required screen 1460. FIG. 14F illustrates a post-event confirmation questionnaire screen 1470. In this example, the post-event confirmation questionnaire screen 1470 is triggered by tapping on the begin survey button 1462 of the exit survey required screen 1460. The crew member begins the survey by tapping on the begin button 1472 of the post-event confirmation questionnaire screen 1470.

Figures 14G, 14H:
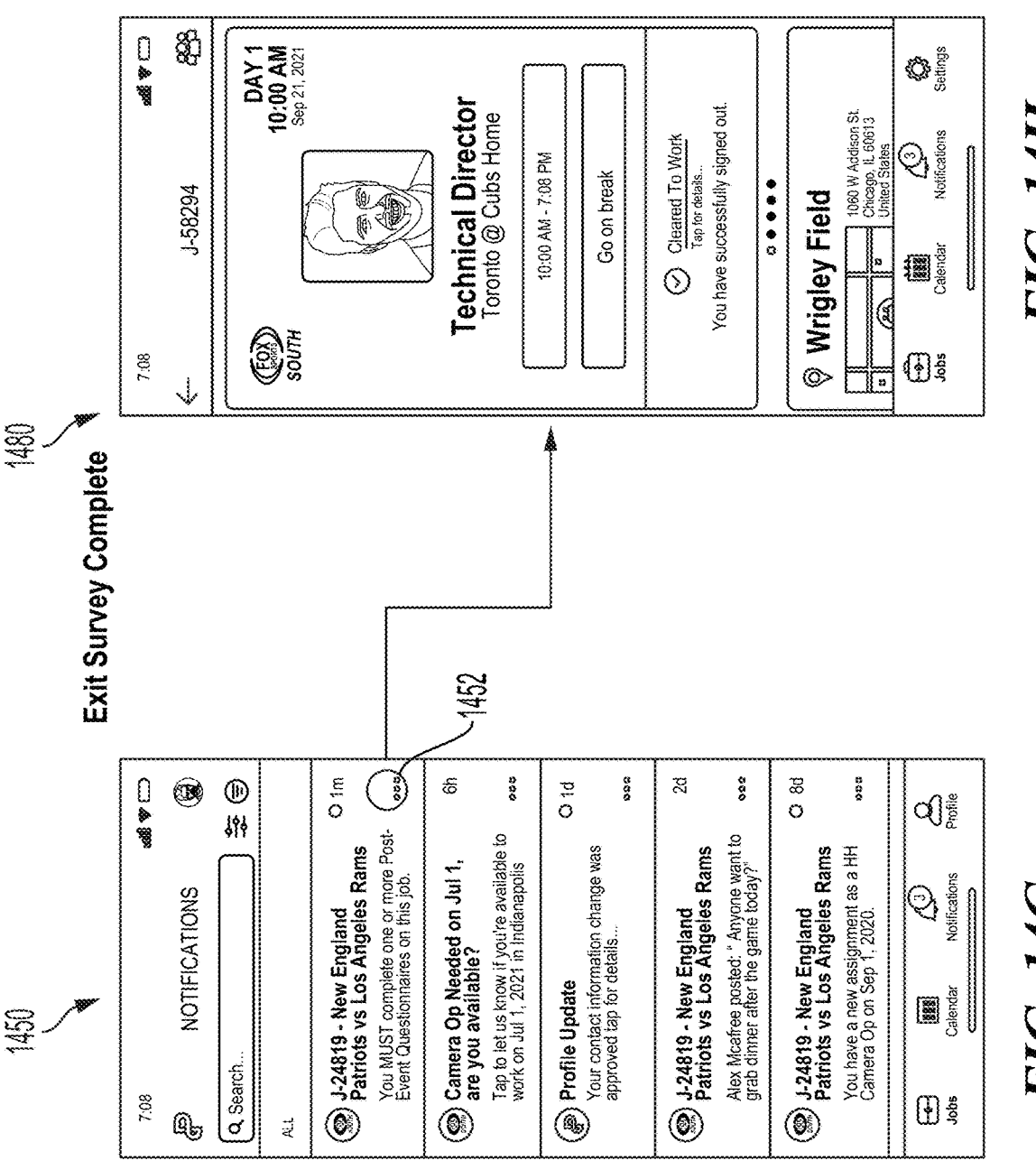

FIG. 14H illustrates a sign out screen 1480, which is also triggered by tapping on the button 1452 of the notifications screen 1450, which is further illustrated in FIG. 14G. The sign out screen 1480 is triggered by completing of the post-event confirmation questionnaire screen 1470. According to aspects of the present disclosure, when a POC or a coordinator adjusts the time in/time out of an employee, the remote employment management system 200 automatically notifies the employee they are required to complete a post event survey for the job.

FIGS. 15A-15K illustrate an event management experience of the remote employment management system 200, including pre-event screening, job management, and post-event surveys, according to aspects of the present disclosure. In particular, FIGS. 15A-15K illustrate each of the states of a labor card that are presented to reflect the flow a user will follow from start to finish of being screened for a job and signing into a job.

Figures 15A, 15B, 15C, 15D:
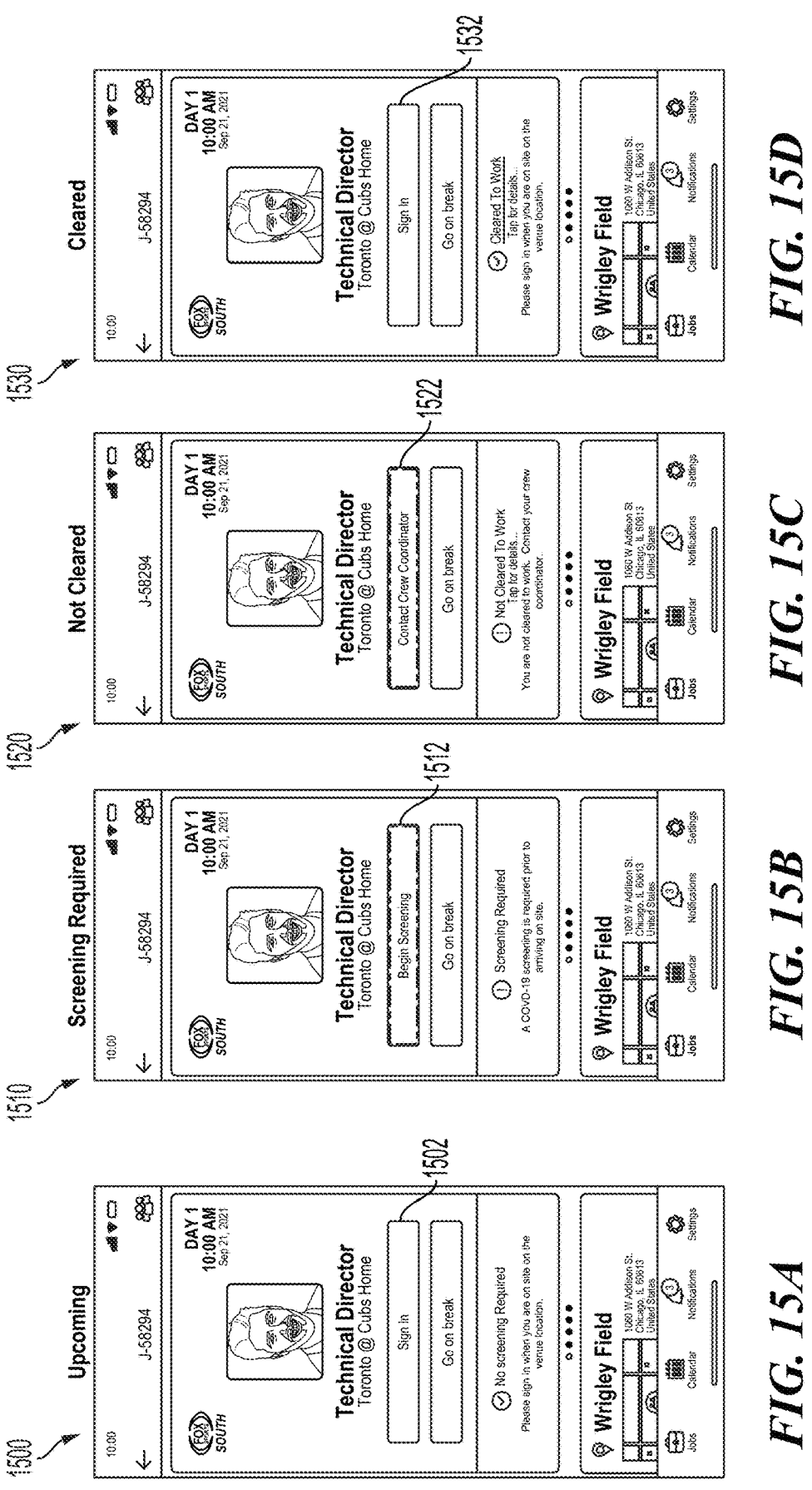
FIGS. 15A-15K illustrate an event management experience of the remote employment management system of FIG. 2, including pre-event screening, job management, and post-event surveys, according to aspects of the present disclosure.

FIG. 15A illustrates an upcoming job labor card screen 1500, in which a crew member is not required to perform a pre-event screening. In this example, the crew member signs in once the crew member is on site at the venue location by tapping on the sign in button 1502. FIG. 15B illustrates a screening required labor card screen 1510 for an upcoming job, in which the crew member is required to perform a pre-event screening. In this example, the crew member begins the pre-event screening (e.g., a COVID-19 test) prior to arriving on site at the venue location by tapping the begin screening button 1512. FIG. 15C illustrates a not cleared labor card screen 1520 in response to a failed pre-event screening (e.g., a positive COVID-19 test). In this example, the crew member is instructed to contact a crew coordinator by tapping the contact crew coordinator button 1522. Otherwise, FIG. 15D illustrates a cleared labor card screen 1530 in response to passed pre-event screening (e.g., a negative COVID-19 test). In this example, the crew member is cleared to work and may sign in to a job once the crew member arrives at the venue location by tapping the sign in button 1532.

Figures 15E, 15F, 15G, 15H:
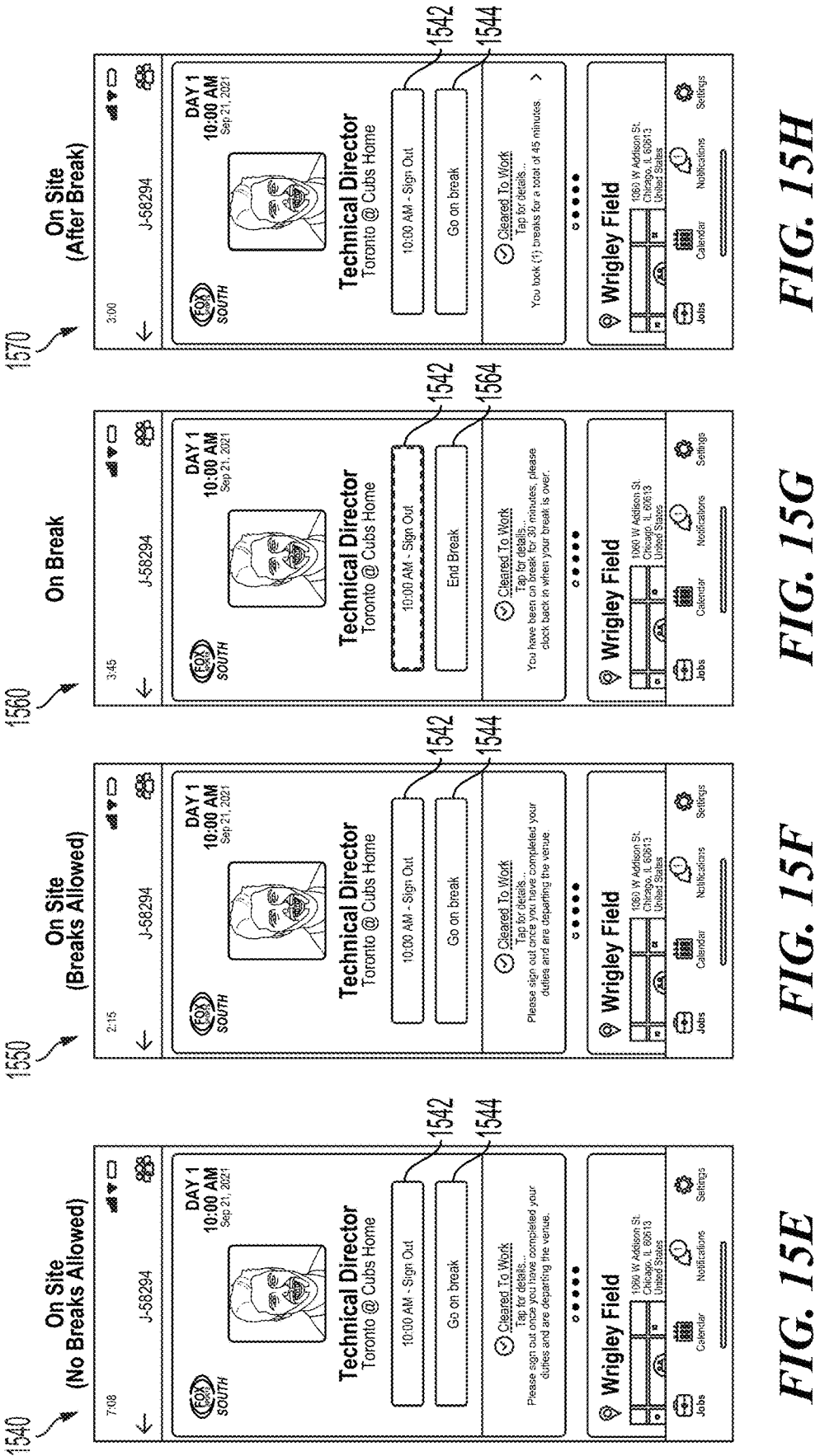

FIG. 15E illustrates a break labor card screen 1540 in response to tapping of the sign in button 1532 of the cleared labor card screen 1530. In this example, a sign out button 1542 is enabled; however, a go on break button 1544 is disabled. By contrast, FIG. 15F illustrates a break labor card screen 1550 in response to tapping of the sign in button 1532 of the cleared labor card screen 1530. In this example, the sign out button 1542 and the go on break button 1544 are enabled. FIG. 15G illustrates an on-break labor card screen 1560 in response to tapping on the go on break button 1544 of the break labor card screen 1550. In this example, the crew member ends the break by tapping on an end break button 1564 and a sign out field 1562 is disabled. FIG. 15H illustrates an on-site labor card screen 1570 in response to tapping on the end break button 1564 of the on-break labor card screen 1560. In this example, the sign out button 1542 and the go on break button 1544 are enabled.

Figures 15I, 15J, 15K:
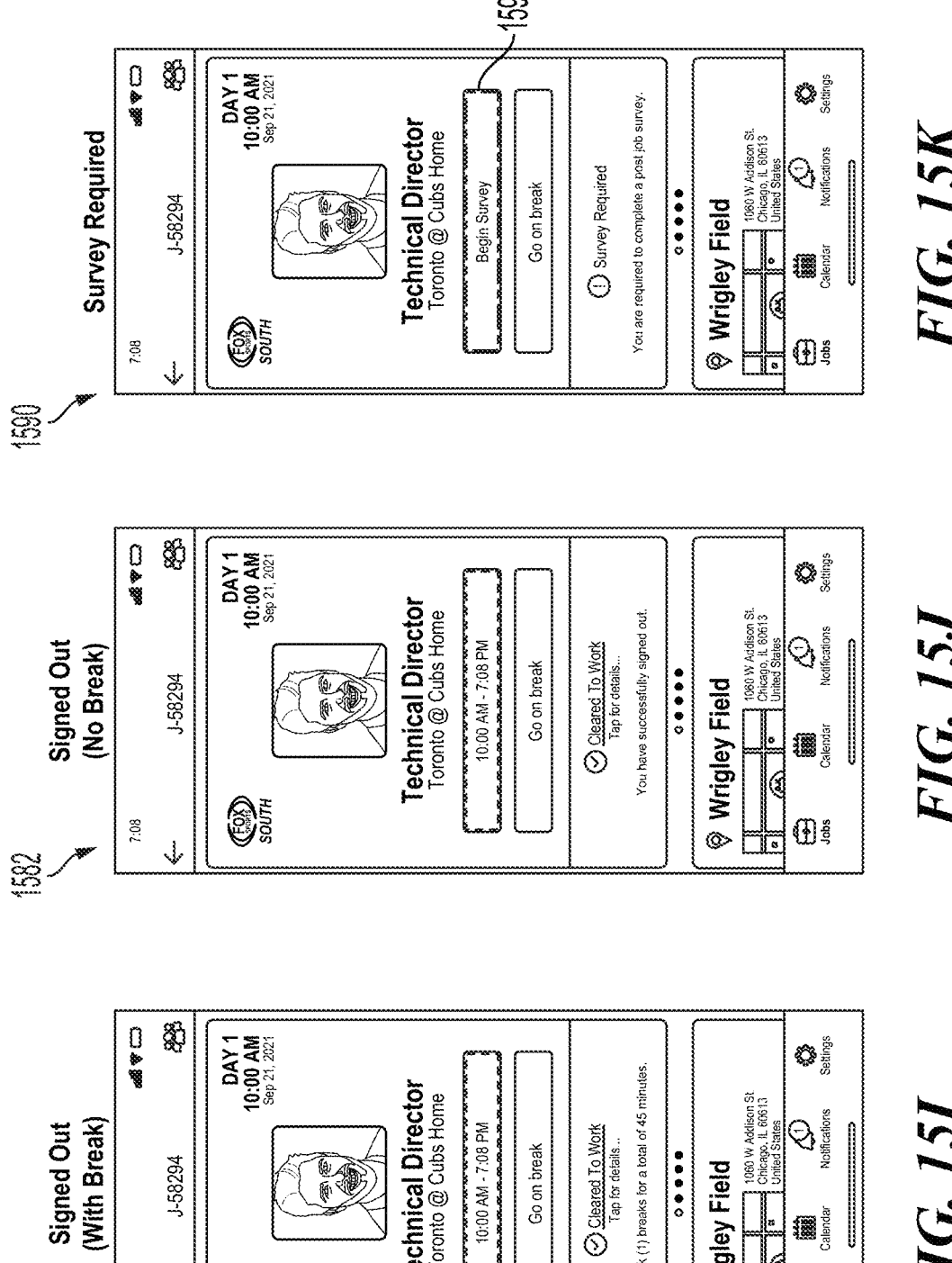

FIG. 15I illustrates a signed out labor card screen 1580 in response to tapping of the sign out button 1542 of the on-break labor card screen 1560 of FIG. 15H. In this example, the crew member took all job breaks as the go on break button 1544 of the break labor card screen 1550 was enabled. By contrast, FIG. 15J illustrates a signed out labor card screen 1582 in response to tapping of the sign out button 1542 of the break labor card screen 1540. In this example, the crew member did not take all job breaks as the go on break button 1544 of the break labor card screen 1540 was disabled, as shown in FIG. 15E. FIG. 15K illustrates a survey required labor card screen 1590 in response to tapping of the sign out button 1542 of the break labor card screen 1540 of FIG. 15E. In this example, the crew member is instructed perform a post-event survey by tapping the begin survey button 1592 due to not taking a job break.

Although the post-event survey is described for having employees attest to whether or not they took their breaks on a job as well as clock-in/clock-out adjustment, other uses of the post-event survey are contemplated according to aspects of the present disclosure. For example, a post-event survey may be used as a job data integrity check (e.g. if an employee is trying to sign out 15 hours after a job ends, the employee may be asked to confirm the hours are indeed correct). In addition, a post-event survey may be used an employee attestation regarding on-site incident reports.

FIG. 16 illustrates a method for geo-fenced remote clock-in/clock-out verification of a remote employment management system according to aspects of the present disclosure. A method 1600 of verifying the login geo-location of a mobile device begins at block 1610. At block 1610, a login geo-location of a mobile device is received when a user (e.g., a remote employee) notifies the mobile device of arrival within a predetermined geo-fenced area of a remote job geo-location. For example, as shown in FIG. 3B, the geo-fence location verification process specifies that an employee is within an allowed radius of a remote job location venue in order to punch in and out by pressing the "PUNCH" button 352 of punch-in display screen 350.

According to aspects of the present disclosure, after the employee is within the allowed radius of the remote job location, the employee clicks on the "PUNCH" button 352 of the punch-in display screen 350. As shown in FIGS. 3A and 3B, the punch-in display screen 350 displays a remote job location (e.g., Allstate Arena), a current time, and a date. The sign-in display screen 302 displays a "SIGN IN" button 304; however, the punch-in display screen 350 is provided to trigger the mobile device 110 to report the login geo-location of the mobile device 110 to the location server 160.

At block 1612, the login geo-location of the mobile device is verified as being within the predetermined geo-fenced area of the remote job location. For example, as shown in FIG. 3B, a predetermined geo-fenced area is established to surround a remote job location (e.g., Allstate Arena) according to, for example, longitudinal and latitudinal positions. In this configuration, the location server 160 may convert the received login geo-location of the mobile device 110 into a longitudinal and a latitudinal position, as shown in FIG. 1A. The login geo-location is verified when the longitudinal and the latitudinal positions of the mobile device 110 fall within the longitudinal and latitudinal positions of the predetermined geo-fenced area of the remote job location. Otherwise, the "PUNCH" request is rejected by the location server 160. As a result, the user of the mobile device 110 is prevented from punching in until arriving at the remote job location.

At block 1614, the mobile device is logged into a remote employment management system when a current time is within a predetermined amount of time before or at a start time. For example, the mobile device is within the predetermined geo-fenced area of Allstate Arena, and the current time (e.g., 1:36 PM) is a predetermined amount of time (e.g., 5 minutes) before or at a start time (e.g., 1:40 PM), as shown in FIG. 3B. Consequently, the user (e.g., employee) of the mobile device 110 is clocked-in to the remote employment management system 200, as shown in FIG. 2. In one aspect of the present disclosure, the location server 160 may be incorporated into the remote employment management system 200.

The remote employment management system 200 may also receive a logout geo-location of the mobile device 110 when the user notifies the mobile device of clock-out within the predetermined geo-fenced area of the remote job geo-location. For example, as shown in FIG. 7A, pressing of the "SIGN OUT" button 722 triggers reporting of the logout geo-location of the mobile device 110 to the remote employment management system 200 (e.g., the location server 160) to request clock-out in response to the sign out request. In response, the logout geo-location of the mobile device 110 is verified as being within the predetermined geo-fenced area of the remote job geo-location.

For example, requesting a clock-out by pressing the "SIGN OUT" button 722 is conditioned on the logout geo-location being within a geo-fenced clock-in/clock-out verification area of the remote job location (e.g., Alex G. Spanos Stadium). Assuming the logout geo-location is verified, the user is logged out of the remote employment management system 200 when the current time is within a predetermined amount of time after (e.g., 5 minutes) or at an end time. In the example shown in FIG. 7, the end time is 4:00 PM and the current time is 4:01 PM. In this configuration, the location server 160 also confirms a logout geo-location when the longitudinal position and the latitudinal position of the logout geo-location are within the longitudinal and latitudinal positions of the predetermined geo-fenced area of the remote job location.

FIG. 17 illustrates a method of reporting a login geo-location for geo-fenced remote clock-in/clock-out verification of a remote employment management system, according to aspects of the present disclosure. A method 1700 of reporting a login geo-location for geo-fenced remote clock-in/clock-out verification of a remote employment management system begins at block 1710. At block 1710, a login geo-location of a mobile device is determined when a user notifies the mobile device of arrival within a predetermined geo-fenced area of a remote job geo-location. For example, as shown in FIG. 5B, the mobile device displays the job detail screen 550, indicating the remote job location (e.g., Wrigley Field), the current time, and the date. The job detail screen 550 also displays the "CLOCK IN" button 552 to trigger the mobile device 110 to report the login geo-location of the mobile device 110 to the location server 160, as shown in FIGS. 1A-1C.

At block 1712, the login geo-location of the mobile device is verified as being within the predetermined geo-fenced area of the remote job geo-location by the mobile device. For example, as shown in FIG. 1B, the mobile device 110 may convert the login geo-location of the mobile device 110 into a longitudinal position and a latitudinal position. The login geo-location is verified when the longitudinal position and the latitudinal position of the login geo-location fall within the longitudinal and latitudinal positions of the predetermined geo-fenced area of the remote job location. Otherwise, the "SIGN IN" request is rejected by the mobile device 110. As a result, the user of the mobile device 110 is prevented from signing in until arriving at the remote job location.

Although longitudinal and latitudinal positions of the login geo-location being within the predetermined geo-fenced area of the remote job location are described, other methods of verification are possible. For example, the user of the mobile device 110 may take a photograph upon arrival at the remote job location. This photograph may be taken of a particular location within the parking lot of the remote job location. For example, the user may take a photograph of a parking location section to verify arrival at the remote job location. This photograph may be used in place of a login geo-location of the user to eliminate tracking of the user's location. Otherwise, tracking of the mobile device 110 is limited to providing the login geo-location to the location server 160. This alternative process may be helpful when a remote job location is initially outside of a venue, such as a fan location (e.g., public space or establishment nearby).

At block 1714, the login geo-location of the mobile device is reported to a location server to request remote clock-in of the user into the remote employment management system. In this example, the user is logged into the remote employment management system 200 when the current time is within a predetermined amount of time before or at a start time. The user (e.g., employee) of the mobile device 110 is clocked-in to the remote employment management system 200 by generating a clock-in/clock-out record to determine working hours for the employee. The method also includes viewing, by a point-of-contact of the remote job location, a sign-in/sign-out record of a crew of the remote job location, and adjusting a sign-in/sign-out time of a crew member. For example, as shown in FIG. 9, the crew management screen 902 allows viewing of a sign-in/sign-out record of a crew of the remote job location. In this configuration, the crew management screen 902 enables the POC of the remote job location to adjust a sign-in/sign-out time of a crew member. In one configuration, the adjusting of the sign-in/sign-out record of the crew member is performed when a sign-in/sign-out operation failure is detected.

In one aspect of the present disclosure, the mobile device 110 may report alternative location data (e.g., a photograph) in lieu of (or to supplement) the login geo-location sent to the location server 160. The method 1700 also includes displaying, by the mobile device, federal and state employment laws based on the remote job location in response to the clock-in of the user into the remote employment management system, for example, as shown in FIG. 6.

One possible use is the remote management of a film crew for a Major League Baseball (MLB) game. As shown in FIG. 2, the remote employment management system enables: (1) creation and management of work rules; (2) scheduling work times; (3) position assignments; (5) assignment schedule request and acceptance; (6) individual schedule/calendar synchronization with user unavailable for work date block (see event and personal calendar module 210); (7) schedule updates or cancellation; and (8) elimination of a time clock. For example, an employee check-in for a remote job location is conditioned on a geo-location of a user device and a geo-fenced area associated with the remote job location (e.g., a stadium) and the current time. In addition, employee check-out from work is conditioned on a geo-location of a user device and a geo-fenced area associated with a remote job location (e.g., a stadium) and the current time, as described in FIGS. 4A and 4B.

FIG. 18 illustrates a method for a remote employment management system, according to aspects of the present disclosure. A method 1800 for the remote employment management system begins at block 1810. At block 1810, an employee at a remote job location is logged into and out of a remote employment management system over a predetermined period of time. For example, as shown in FIG. 5B, the job detail screen 550 displays the "CLOCK IN" button 552 to trigger a clock-in record with the remote employment management system 200. As shown in FIG. 7A, pressing of the "SIGN OUT" button 722 triggers a clock-in record with the remote employment management system 200 after completion of the Indianapolis Colts vs. Miami Dolphins football game. In these examples, the employee is logged into the remote employment management system 200 when the current time is within a predetermined amount of time before or at a start time and logged-out after an end time. The employee is clocked-in and clocked-out of the remote employment management system 200 by generating a clock-in/clock-out record to determine working hours for the employee.

At block 1812, a jurisdiction, sales tax, and/or union benefits are determined according to a remote job location and a remote job position of the employee at the remote job location. For example, as shown in FIG. 8C, a job detail screen 802 displays a pay summary section 872, as well as a notes, message board, and documents sections. In this example, the pay summary section 872 indicates an esti-mated pay amount of $614.60, an actual pay amount of $614.60, an estimated benefits amount of $97.97, an actual benefits amount of $97.97, an estimated hours amount of 10, and an estimated hours amount of 10 are shown. As shown in FIG. 8D, a benefits screen 880 is triggered by pressing an information icon 874 of the pay summary section 872 of the job detail screen 802 shown in FIG. 8C. The benefits screen 880 includes a Pension section 882, a Health & Welfare section 884, and an Annuity section 886. At block 1814, a paycheck for the employee is generated according to the jurisdiction, sales tax, and/or union benefits determined according to the remote job location and the remote job position of the employee after the predetermined period of time.

FIG. 19 illustrates a method for a multi-step job offer process with digital acceptance of a remote employment management system, according to aspects of the present disclosure. A method 1900 for the a multi-step job offer process with digital acceptance begins at block 1910. At block 1910, a crew manager of an upcoming remote job at the remote job location identifies crew members for the remote job location. According to this method potential crew members set their availability through a mobile application implementing the remote employment management system, for example, as shown in FIGS. 5A and 5B. The crew manager may identify potential crew members for the remote job location through the mobile application imple-menting the remote employment management system.

Once identified, at block 1912, the mobile application transmits a digital offer to the identified crew members for employment at the remote job location for the predetermined period of time beginning at a predetermined start date and end date. For example, as shown in FIG. 10B, a potential crew member Amy Scheller is selected and offered a job as a Technical Director using the Offer Job button 1072. In aspects of the present disclosure, pressing of the Offer Job button 1072 triggers a job offer detail screen, for example, as shown in FIG. 10C.

In this aspect of the present disclosure, at block 1914, the crew manager receives, through the mobile application, a digital acceptance from at least a predetermined number of the crew members prior to the predetermined start date to establish a production crew for the remote job location. For example, as shown in FIG. 10B, Once Amy Scheller accepts the job offer and becomes a crew member, she may be assigned the Technical Director position using the Assign button 1074. As shown in FIG. 10A-10D, the job screen 1000, the job detail screen 1060, the job offer detail screen 1080, and the job acceptance/denial screen 1090 enable offer, acceptance, and assignment of a production job. In these aspects of the present disclosure, the various job screen provide a detailed chain of a multi-step crew job offer communication, acceptance, and production job assignment process, according to aspects of the present disclosure.

In other aspects of the present disclosure, a method of the mobile application of the remote employment management system also includes determining state mandated training according to the remote job location. For example, as shown in FIG. 5B, a documents icon 560 (e.g., labor law document access) is shown, which may also be used for determining any state mandated training. Once determined, the remote employment management system verifies the production crew receives the determined state mandated training prior to the predetermined start date. The mobile application method may also computing dark days, travel days, regular hours, sick days, and/or paid time off according to the according to the jurisdiction, sales tax, and/or union benefits determined based on the remote job location and the remote job position of the employee. In addition, the mobile appli-cation displays federal and state employment laws based on the remote job location in response to a clock-in of the employee into the remote employment management system, as shown in FIG. 5B.

The method also includes viewing, by a point-of-contact of the remote job location, a sign-in/sign-out record of a crew of the remote job location, and adjusting a sign-in/sign-out time of a crew member. For example, as shown in FIG. 9, the crew management screen 902 allows viewing of a sign-in/sign-out record of a crew of the remote job location. In this configuration, the crew management screen 902 enables the POC of the remote job location to adjust a sign-in/sign-out time of a crew member. In one configura-tion, the adjusting of the sign-in/sign-out record of the crew member is performed when a sign-in/sign-out operation failure is detected.

Aspects of the remote employment management system 200 provide an end-to-end employee time and expense management system, further including: (9) employee profile creation and update including credential integration and photo (see FIGS. 5A and 5B); (10) employee messaging specific to job or assignment (see FIG. 7); (11) specific employee communication and oversight functionality for job foreman/manager/point-of-contact (POC), as shown in FIG. 9; (12) expense submission and approval, including e-receipt submission (see expense submission and approval module 220); (13) travel request arrangement and approval; (14) travel pay request, including rules definition and auto flight time updates and flight status updates and drive time estimates; (15) review staff on a crew or job by name, position, check-in/out status; (16) integration with 3rd party job/project creation systems for assignments, resource man-agement, payroll, expense reimbursement, travel approval; (17) government specified notices and posters (see FIG. 6); (18) documents including tech books and other job related documents; (19) crew call updates; and (20) company announcements to employees.

The disclosure may be implemented in conjunction with Wi-Fi/wireless local area network (WLAN) or other wire-less networks. In addition to Wi-Fi/WLAN signals, a wire-less/mobile station may also receive signals from satellites, which may be from a global positioning system (GPS), Galileo, GLONASS, NAVSTAR, QZSS, a system that uses satellites from a combination of these systems, or any satellite positioning system developed in the future, each referred to generally herein as a satellite positioning system (SPS) or global navigation satellite system (GNSS). The disclosure may also be implemented in conjunction with pseudolites or a combination of systems that includes pseudolites. The disclosure may also be implemented in conjunction with femtocells or a combination of systems that includes femtocells.

Position determination techniques described herein may be implemented in conjunction with various wireless communications networks, such as a wireless wide area network (WWAN), a WLAN, a wireless personal area network (WPAN), and so on. The term "network" and "system" are often used interchangeably. A WWAN may be a code division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a long term evolution (LTE) network, a WiMAX (IEEE 802.16) network, and so on. A CDMA network may implement one or more radio access technologies (RATs) such as CDMA2000, wideband-CDMA (W-CDMA), and so on. CDMA2000 includes IS-95, IS-2000, and IS-856 standards. A TDMA network may implement global system for mobile communications (GSM), digital advanced mobile phone system (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

Although the preceding description was primarily with respect to GPS, the method and apparatus described herein may be used with various global satellite positioning systems (SPS). A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs).

For example, an SV in a constellation of a global navigation satellite system (GNSS), such as global positioning system (GPS), Galileo, Glonass or Compass, may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a satellite based augmentation system (SBAS)) that may be associated with or otherwise enabled for use with one or more global and/or regional navigation satellite systems.

By way of example but not limitation, an SBAS may include an augmentation system(s) that provides integrity information, differential corrections, etc., such as, e.g., a wide area augmentation system (WAAS), European Geostationary Navigation Overlay Service (EGNOS), multi-functional satellite augmentation system (MSAS), GPS aided geo augmented navigation or GPS and Geo augmented navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The methodologies may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite may be unavailable, such as in tunnels, mines, buildings, urban canyons or other enclosed areas. Another implementation of pseudolites is known as radio-beacons. The term "satellite," as used herein, is intended to include pseudolites, equivalents of pseudolites, and possibly others. The term "SPS signals," as used herein, is intended to include SPS-like signals from pseudolites or equivalents of pseudolites.

As described herein, a mobile device refers to a device, such as a cellular or other wireless communications device, personal communication systems (PCS) device, personal navigation device (PND), personal information manager (PIM), personal digital assistant (PDA), laptop, tablet, or other suitable mobile station device that is capable of receiving wireless communications and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communications devices, computers, laptops, etc., which are capable of communications with a server, such as via the Internet, Wi-Fi, or other networks, and regardless of whether satellite signal reception, assistance reception, and/or position-related processing occurs at the device, at a server, or at another device associated with the network. Any operable combination of the above are also considered a "mobile device."

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

The various illustrative logical blocks, modules, and circuits described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, micro-controller, or state machine. A processor may also be implemented as a combination of computing devices, e.g., a combination of a DSP and a microprocessor, multiple micro-processors, one or more microprocessors in conjunction with a DSP core, or any other such configuration.

In addition to storage on computer-readable medium, instructions and/or data may be provided as signals on transmission media included in a communications appara-tus. For example, a communications apparatus may include a transceiver having signals indicative of instructions and data. The instructions and data are configured to cause one or more processors to implement the functions outlined in the claims, although the communications apparatus may not store all of the instructions and/or data on a computer-readable medium.

Although the present disclosure and its advantages have been described in detail, it should be understood that various changes, substitutions, and alterations can be made herein without departing from the technology of the present dis-closure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present appli-cation is not intended to be limited to the particular con-figurations of the process, machine, manufacture, and com-position of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configu-rations described herein may be utilized according to the present disclosure. Accordingly, the appended claims are intended to include within their scope such processes, machines, manufacture, compositions of matter, means, methods, or steps.

What is claimed is:

1. A method for providing a remote employment man-agement system, comprising:

providing remote access, over a network, to i) a mobile device of an employee for accessing the remote employment management system, and ii) a computing device of a point-of-contact user;

generating a user interface, by one or more processors of a computing system and for the mobile device of the employee, the user interface being accessed over the network and including a deactivated log-in user inter-face element for logging into the remote employment management system;

detecting, by the one or more processors of the computing system, a trigger, wherein detecting the trigger includes detecting that the mobile device of the employee is within a specified radius of a remote job location;

based on detection of the trigger including detecting that the mobile device is within the specified radius of the remote job location, activating, by the one or more processors of the computing system, the deactivated log-in user interface element for logging into the remote employment management system;

receiving selection, by the one or more processors of the computing system and from the mobile device of the employee, of the activated log-in user interface element for signing into the remote employment management system;

based on the received selection of the activated user interface element:

obtaining, by the one or more processors of the com-puting system, one or more geo-locations of the mobile device of the employee via one or more location detection components of the mobile device of the employee;

automatically verifying, by the one or more processors of the computing system, that the one or more geo-locations correspond to the mobile device of the employee being in a predetermined geo-fenced clock-in/clock-out verification area of a remote job location by utilizing a distance application program interface (API); and determining, by the one or more processors of the computing system, that a log-in time, at which selection of the activated log-in user interface ele-ment is received, is within a predetermined amount of time before a start time for the remote job loca-tion;

based on the verifying that the one or more geo-locations correspond to the mobile device being in the predeter-mined geo-fenced clock-in/clock-out verification area and the determining that the current time is within the predetermined amount of time before the start time for the remote job location:

logging, by the one or more processors of the comput-ing system, the employee into the remote employ-ment management system;

upon logging the employee into the remote employ-ment management system, automatically generating a first push notification including the log-in time at which selection of the activated log-in user interface element is received;

transmitting, over the network, the first push notifica-tion to the computing device of the point-of-contact user, so that the point-of-contact user has access to up-to-date information for the employee; and providing, by the one or more processors of the computing system, an update to the user interface of the mobile device of the employee, wherein the update replaces the activated log-in user interface element with an activated log-out user interface element on the user interface, and wherein the update includes a pay summary module estimating pay for the employee based on one or more pay rates for the employee, the log-in time, and an estimated log-out time;

receiving selection of the activated log-out user interface element, by the one or more processors of the computing system and from the mobile device of the employee, after a duration of time elapsed from the log-in time;

upon receiving selection of the activated log-out user interface element, automatically generating a second push notification including an actual log-out time corresponding to when selection of the activated log-out user interface element is received;

transmitting, over the network, the second push notification to the computing device of the point-of-contact user, so that the point-of-contact user has access to up-to-date information for the employee;

updating the pay summary module on the user interface, the updated pay summary module estimating actual pay for the remote employee based on the one or more pay rates for the employee, the log-in time, and the actual log-out time;

determining, by the one or more processors of the computing system, a jurisdiction, sales tax, and/or union benefits according to the remote job location and a remote job position of the employee at the remote job location; and generating, by the one or more processors of the computing system, a paycheck for the employee according to A) the jurisdiction, sales tax, and/or the union benefits determined according to the remote job location and the remote job position of the employee and B) the estimated actual pay for the remote employee.

2. The method of claim 1, in which the predetermined period of time comprises a multiple hour period of time associated with a live event at the remote job location.

3. The method of claim 1, in which determining the jurisdiction, sales tax, and/or the union benefits comprises determining a union pay rate for the employee according to the jurisdiction, sales tax, and/or the union benefits determined according to the remote job location and the remote job position of the employee.

4. The method of claim 1, further comprising:

identifying crew members for the remote job location;

transmitting a digital offer to the identified crew members for employment at the remote job location for the predetermined period of time beginning at a predetermined start date and end date; and receiving a digital acceptance from at least a predetermined number of the identified crew members prior to the predetermined start date to establish a production crew for the remote job location.

5. The method of claim 4, further comprising notifying the production crew when a predetermined event is detected regarding the remote job location.

6. The method of claim 5, in which notifying the production crew comprises communicating a testing location to the production crew in response to logging the production crew at the remote job location.

7. The method of claim 5, in which the notifying comprises issuing a message to the production crew in response to detection of a positive test for a contagious disease at the remote job location.

8. The method of claim 5, further comprising:

determining state mandated training according to the remote job location; and verifying the production crew received the determined state mandated training prior to the predetermined start date.

9. The method of claim 1, further comprising arranging transportation for at least one of a predetermined number of crew members of a production crew prior to a predetermined start date.

10. The method of claim 1, in which the remote job location comprises a sporting stadium in which a live sporting event is being performed.

11. The method of claim 1, in which determining the jurisdiction, sales tax, and/or union benefits comprises computing dark days, travel days, regular hours, sick days, and/or paid time off.

12. The method of claim 1, further comprising:

viewing, by a crew manager of the remote job location, a sign-in/sign-out record of a production crew of the remote job location;

adjusting a sign-in/sign-out time of a crew member of the production crew; and generating a clock-in/clock-out record in the remote employment management system.

13. The method of claim 12, in which the adjusting of the sign-in/sign-out record of the crew member is performed when an initial remote job location for the crew member is outside a predetermined geo-fenced clock-in verification area.

14. The method of claim 12, in which the adjusting of the sign-in/sign-out record of the crew member is performed when a sign-in/sign-out operation failure is detected.

15. The method of claim 12, in which the adjusting further comprising triggering a post-event confirmation questionnaire for the crew member of the production crew regarding the adjusting sign-in/sign-out time of the crew member.

16. The method of claim 1, further comprising displaying, by the mobile device and on the user interface, federal and state employment laws based on the remote job location in response to the logging the employee into the remote employment management system.

17. The method of claim 1, further comprising:

based on the generating of the paycheck for the employee, further updating the pay summary module with an actual payout indicated by the paycheck.

18. A remote employment management system, comprising:

one or more processors; and one or more memories storing instructions that, when executed by the one or more processors, cause the remote employment management system to:

provide remote access, over a network, to i) a mobile device of an employee for accessing a user interface, the user interface including a deactivated log-in user interface element for logging into the remote employment management system, and ii) a computing device of a point-of-contact user;

detect a trigger, wherein detecting the trigger includes detecting that the mobile device of the employee is within a specified radius of a remote job location;

based on detection of the trigger including detecting that the mobile device of the employee is within a specified radius of the remote job location, activate the deactivated log-in user interface element for logging into the remote employment management system;

receive selection, from the mobile device of the employee, of the activated log-in user interface element for signing into the remote employment management system;

based on the received selection of the activated user interface element:

obtain one or more geo-locations of the mobile device of the employee via one or more location detection components of a mobile device of the employee;

automatically verify that the one or more geo-locations correspond to the employee being in a predetermined geo-fenced clock-in/clock-out verification area of a remote job location by utilizing a distance application program interface (API); and determine that a log-in time, at which selection of the activated log-in user interface element is received, is within a predetermined amount of time before a start time for the remote job location;

based on the verifying that the one or more geo-locations correspond to the mobile device being in the predetermined geo-fenced clock-in/clock-out verification area and the determining that the current time is within the predetermined amount of time before the start time for the remote job location:

log the employee into the remote employment management system;

upon logging the employee into the remote employment management system, automatically generate a first push notification including the log-in time at which selection of the activated log-in user interface element is received;

transmit, over the network, the first push notification to the computing device of the point-of-contact user, so that the point-of-contact user has access to up-to-date information for the employee; and provide an update to the user interface of the mobile device of the employee, wherein the update replaces the activated log-in user interface element with an activated log-out user interface element on the user interface, and wherein the update including a pay summary module estimating pay for the employee based on one or more pay rates for the employee, the log-in time, and an estimated log-out time;

receive selection of the activated log-out user interface element, from the mobile device of the employee, after a duration of time elapsed from the log-in time;

upon receiving selection of the activated log-out user interface element, automatically generate a second push notification including a log-out time corresponding to when selection of the activated log-out user interface element is received;

transmit, over the network, the second push notification to the computing device of the point-of-contact user, so that the point-of-contact user has access to up-to-date information for the employee;

update the pay summary module on the user interface, the updated pay summary module estimating actual pay for the remote employee based on the one or more pay rates for the remote employee, the log-in time, and the actual log-out time;

determine a jurisdiction, sales tax, and/or union benefits according to the remote job location and a remote job position of the employee at the remote job location; and generate a paycheck for the employee according to A) the jurisdiction, sales tax, and/or the union benefits determined according to the remote job location and the remote job position of the employee and B) the estimated actual pay for the remote employee.

19. The remote employment management system of claim 18, in which the predetermined period of time comprises a multiple hour period of time associated with a live event at the remote job location.

20. The remote employment management system of claim 18, wherein determining the jurisdiction, sales tax, and/or user benefits includes determining a union pay rate for the employee.

\* \* \* \* \*